United States Patent
Yamaguchi et al.

(10) Patent No.: US 11,282,300 B2
(45) Date of Patent: Mar. 22, 2022

(54) TOLL COLLECTION SYSTEM AND SOUNDNESS DETERMINATION METHOD

(71) Applicant: MITSUBISHI HEAVY INDUSTRIES MACHINERY SYSTEMS, LTD., Hyogo (JP)

(72) Inventors: Yasuhiro Yamaguchi, Tokyo (JP); Kenta Nakao, Tokyo (JP); Hiroyuki Nakayama, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 637 days.

(21) Appl. No.: 16/088,478

(22) PCT Filed: Mar. 31, 2016

(86) PCT No.: PCT/JP2016/061632
§ 371 (c)(1),
(2) Date: Sep. 26, 2018

(87) PCT Pub. No.: WO2017/168760
PCT Pub. Date: Oct. 5, 2017

(65) Prior Publication Data
US 2019/0122450 A1    Apr. 25, 2019

(51) Int. Cl.
*G07B 15/06* (2011.01)
*G07B 15/00* (2011.01)
(Continued)

(52) U.S. Cl.
CPC .......... *G07B 15/063* (2013.01); *G06Q 50/30* (2013.01); *G07B 15/00* (2013.01); *G07B 15/06* (2013.01); *H04W 4/40* (2018.02); *G06Q 2240/00* (2013.01)

(58) Field of Classification Search
CPC ........ G07B 15/00; G07B 15/02; G07B 15/06; G07B 15/063
See application file for complete search history.

(56) References Cited

U.S. PATENT DOCUMENTS

| | | | | |
|---|---|---|---|---|
| 2002/0140577 | A1* | 10/2002 | Kavner | G07B 15/063 340/933 |
| 2007/0008179 | A1* | 1/2007 | Hedley | G07B 15/06 340/928 |
| 2016/0078299 | A1* | 3/2016 | Nerayoff | G08G 1/00 705/13 |

FOREIGN PATENT DOCUMENTS

| JP | 2004102666 A | 4/2004 |
|---|---|---|
| JP | 2004246818 A | 9/2004 |

(Continued)

OTHER PUBLICATIONS

Pennsylvania Turnpike Commission, Request for Proposals for Operations and Maintenance Support of Toll Collection Hardware Findlay Connector/Southern Beltway PA Turnpike 576, Jul. 28, 2011, p. 56 (Year: 2011).*

(Continued)

*Primary Examiner* — Emmett K. Walsh
*Assistant Examiner* — Michelle E Carey
(74) *Attorney, Agent, or Firm* — Kanesaka Berner and Partners LLP

(57) ABSTRACT

A toll collection system includes: a roadside antenna operable to carry out wireless communications with an onboard unit mounted on a vehicle; a wireless communication control device operable to carry out communication processing with the onboard unit; a toll collection processing unit operable to acquire, from the wireless communication control device, a result of the communication processing, and to carry out toll collection processing for the onboard unit based on the result of the communication processing; a (Continued)

vehicle detector operable to detect a vehicle entering a communication range of the roadside antenna; a soundness determination unit operable to determine, based on a detection result of the vehicles by the vehicle detector and a result of the toll collection processing carried out by the toll collection processing unit, whether an abnormality has occurred in at least any one of the roadside antenna, the wireless communication control device, and the toll collection processing unit.

5 Claims, 13 Drawing Sheets

(51) Int. Cl.
    *G06Q 50/30*     (2012.01)
    *H04W 4/40*     (2018.01)

(56) References Cited

FOREIGN PATENT DOCUMENTS

| | | |
|---|---|---|
| JP | 2005085046 A | 3/2005 |
| JP | 2010061435 A | 3/2010 |
| JP | 2015153383 A | 8/2015 |

OTHER PUBLICATIONS

International Search Report and Written Opinion for International Application No. PCT/JP2016/061632 dated Jul. 19, 2016; 13pp.

* cited by examiner

TOLL COLLECTION SYSTEM AND SOUNDNESS DETERMINATION METHOD

RELATED APPLICATIONS

The present application is a National Phase of International Application Number PCT/JP2016/061632 filed Mar. 31, 2016.

TECHNICAL FIELD

The present invention relates to a toll collection system and a soundness determination method.

BACKGROUND ART

Generally, an electronic toll collection system (ETC: Electronic Toll Collection System (trade name), also referred to as an "automatic toll collection system") is installed in toll gates with a start controller, and the like disposed in an island (lane separator). In contrast, the introduction of a free flow type electronic toll collection system for carrying out nonstop toll collection on vehicles driving on the main line of an expressway has recently been researched (for example, refer to Patent Document 1).

Upon entering existing toll gates, a user must normally decelerate, temporarily stop, a vehicle, or the like. However, with a free flow type electronic toll collection system, a user need not decelerate, temporarily stop, a vehicle, or the like but rather allow communication between an onboard unit mounted on the vehicle and roadside equipment simply by passing under a gantry at normal driving speed. Thereby, the effect of relieving traffic congestion, and the like is expected, further enhancing the convenience of expressways.

CITATION LIST

Patent Document

Patent Document 1: JP 2005-085046 A

SUMMARY OF INVENTION

Problem to be Solved by the Invention

In the above-mentioned toll collection system, information for toll collection necessary for collecting tolls from each user (personal contract information, vehicle type information, and the like of an IC card) is generally acquired via communication between the onboard unit and roadside equipment. Here, in a case where a period during which information for toll collection is not acquired continues in the toll collection system, a monitoring person of the toll collection system, and the like cannot immediately determine during the period whether vehicles have actually not passed or vehicles have passed but some abnormality in the system has prevented information for toll collection from being acquired.

It is contemplated that in the case of a free flow type toll collection system, in a case where the discovery and recovery of abnormalities is delayed, a large number of vehicles may pass during this time without being subjected to regular toll collection processing, thereby causing a great operational disadvantage.

In view of the above-mentioned problems, the present invention provides a free flow type toll collection system which can detect abnormalities of the system, along with a soundness determination method.

Solution to Problem

A toll collection system (1) according to an aspect of the invention includes: a roadside antenna (3a, 3b) operable to carry out wireless communications with an onboard unit (A1) mounted on a vehicle (A); a wireless communication control device (2a, 2b) operable to carry out communication processing based on predetermined communication specifications with the onboard unit via the roadside antenna; a toll collection processing unit (10) operable to acquire a result of the communication processing from the wireless communication control device and to carry out toll collection processing for the onboard unit based on the result of the communication processing; a vehicle detector (5a, 5b, 5c) operable to detect a vehicle entering a communication range of the roadside antenna; and a soundness determination unit (120a) operable to determine, based on a detection result of the vehicle by the vehicle detector and a result of the toll collection processing by the toll collection processing unit, whether an abnormality has occurred in at least any one of the roadside antenna, the wireless communication control device, and the toll collection processing unit.

As such, the vehicle detector detects the vehicle entering the communication range of the roadside antenna. The toll collection processing unit, on the other hand, carries out the toll collection processing for those of the vehicles entering the communication range of the roadside antenna that are equipped with the onboard units. Thus, the soundness determination unit determines, based on the result of detecting the vehicle and the result of the toll collection processing, whether abnormality has occurred in any one of the roadside antenna, the wireless communication control device, and the toll collection processing unit.

According to an aspect of the invention, in the toll collection system of the above-described aspect, the vehicle detector includes a vehicle type determination unit (52) operable to determine a vehicle type of the detected vehicle, and the soundness determination unit is operable to determine, based on the result of detecting the vehicle acquired by vehicle type and the result of the toll collection processing acquired by vehicle type, whether the abnormality has occurred.

As such, the soundness determination unit acquires, by vehicle type determined by the vehicle type determination unit, both the result of detecting the vehicle and the result of the toll collection processing. Hence, in a case where the equipment ratio (ownership rate) of the onboard unit varies from one vehicle type to another, the soundness determination unit determines, based on the ownership rate of a particular onboard unit, whether the result of the toll collection processing is reasonable for the result of detecting the vehicle. Accordingly, the soundness determination unit determines more accurately whether an abnormality has occurred.

According to an aspect of the invention, the toll collection system of the above-described aspect further includes a restart unit (120b) operable to make at least any one of the roadside antenna, the wireless communication control device, and the toll collection processing unit carry out restart processing in a case where the soundness determination unit determines that the abnormality has occurred.

As such, in the case where the soundness determination unit determines that an abnormality has occurred, the restart unit automatically restarts at least any one of the roadside antenna, the wireless communication control device, and the toll collection processing unit. Hence, monitoring person of the tollgate or the like need not determine whether an abnormality has occurred, but each constituent apparatus of the toll collection system is recovered automatically from the abnormal state and thus is operated normally.

According to an aspect of the invention, the toll collection system of the above-described aspect further includes an extraction unit (120c) operable to extract, during the restart processing, license plate information of the vehicle detected by the vehicle detector, and the vehicle detector includes a license plate reader (51) operable to read the license plate information of the vehicle.

During the restart processing, the toll collection processing unit cannot carry out toll collection processing for the onboard unit mounted on the vehicle on the lane where the apparatus that is carrying out the restart processing exists. With the above-described configuration, however, the extraction unit extracts the license plate information of the vehicle detected by the vehicle detector while the restart processing is being carried out. Thus, based on the license plate information extracted by the extraction unit while the restart processing is being carried out, the monitoring person or the like of the tollgate identifies the vehicle for which no toll collection processing is carried out and thereby demands the payment of the toll from the driver or the like of the vehicle.

According to an aspect of the invention, in the toll collection system of the above-described aspect, the soundness determination unit is operable to calculate, based on the result of detecting the vehicle and the result of the toll collection processing, an equipment ratio representing the ratio of vehicles each of which is equipped with the onboard unit, and to set, based on the equipment ratio, a threshold value for determining whether an abnormality has occurred.

As such, the soundness determination unit calculates the equipment ratio of the onboard unit based on the result of detecting the vehicle and the result of the toll collection processing. Hence, based on the equipment ratio calculated for each tollgate, the soundness determination unit sets the threshold value for determining whether an abnormality has occurred. Accordingly, the soundness determination unit determines more accurately whether an abnormality has occurred.

A soundness determination method according to an aspect of the invention implemented in a toll collection system includes: a roadside antenna operable to carry out wireless communications with an onboard unit mounted on a vehicle; a wireless communication control device operable to carry out communication processing based on predetermined communication specifications with the onboard unit via the roadside antenna; a toll collection processing unit operable to acquire a result of the communication processing from the wireless communication control device and to carry out toll collection processing for the onboard unit based on the result of the communication processing; and a vehicle detector operable to detect a vehicle entering a communication range of the roadside antenna, the method including the steps of: acquiring, by means of the vehicle detector, a result of detecting a vehicle entering the communication range of the roadside antenna; acquiring a result of the toll collection processing carried out by means of the toll collection processing unit; and determining, based on the result of detecting a vehicle and the result of the toll collection processing, whether an abnormality has occurred in any one of the roadside antenna, the wireless communication control device, and the toll collection processing unit.

Advantageous Effect of Invention

The above-mentioned toll collection system and soundness determination method provide a free flow type toll collection system which detects abnormalities of the system quickly and accurately.

DESCRIPTION OF EMBODIMENTS

Embodiment 1

Hereinafter, a toll collection system according to Embodiment 1 will be described in detail with reference to FIGS. 1 to 5.

Overall Configuration of Toll Collection System

Figure 1:
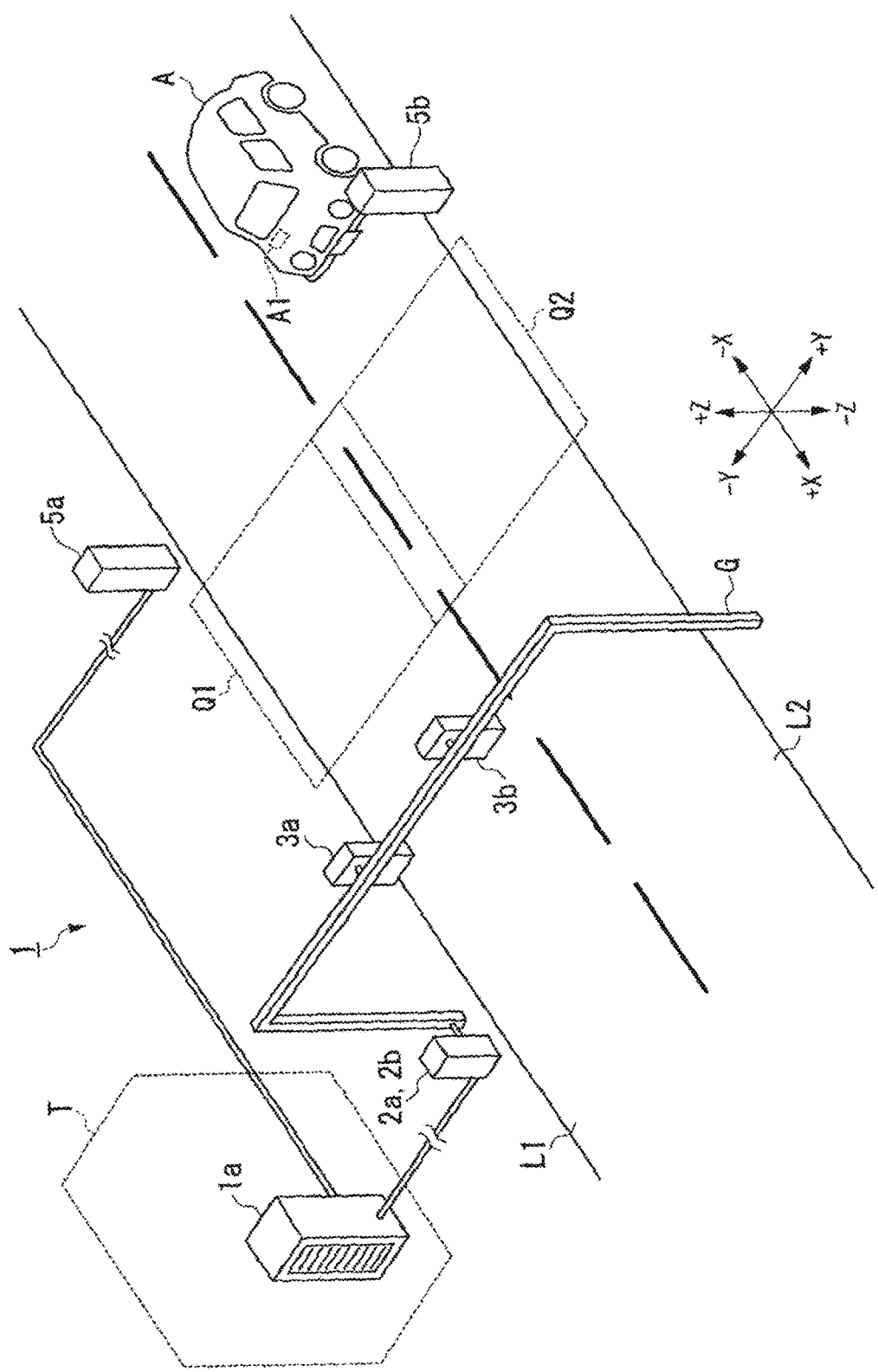
FIG. 1 is a diagram illustrating an overall configuration of a toll collection system according to Embodiment 1.

FIG. 1 is a diagram illustrating an overall configuration of a toll collection system according to Embodiment 1.

A toll collection system 1 according to the present embodiment is a free flow type electronic toll collection system installed on the main line of an expressway (hereinafter, also described as a "main road") including two lanes L1 and L2.

As illustrated in FIG. 1, toll collection system 1 carries out communication processing for a toll collection with onboard unit A1 mounted on a vehicle A while the vehicle is running on the main road (including the lanes L1 and L2), and executes toll collection processing on users boarding this vehicle A.

As illustrated in FIG. 1, the toll collection system 1 includes a toll collection processing device 1a, wireless communication control devices 2a and 2b, roadside antennas 3a and 3b, and vehicle detectors 5a and 5b.

As illustrated in FIG. 1, the toll collection processing device 1a is installed in communication tower T distant from main roads (including the lanes L1 and L2).

The wireless communication control devices 2a and 2b are installed on the roadsides of the lanes L1 and L2, respectively and in the vicinity of a gantry G. The wireless communication control devices 2a and 2b carry out communication processing with the onboard unit A1 via their corresponding roadside antennas 3a and 3b to acquire information for toll collection.

The roadside antennas 3a and 3b are attached to the gantry G, which is disposed across the lane width direction of the lanes L1 and L2 (extending in the ±Y direction of FIG. 1) and fixed over each of the lanes L1 and L2.

The vehicle detectors 5a and 5b are installed on the roadsides of the lanes L1 and L2, respectively and on the upstream side of the gantry G in the lane direction (at a position away from the gantry G in –X direction of FIG. 1). The vehicle detectors 5a and 5b detect the entry of the vehicle A running on the lanes L1 and L2, respectively, into a region where the vehicle A is capable of carrying out wireless communications with the roadside antennas 3a and 3b, respectively (description of the above-mentioned region will be given later).

Note that other embodiments are not limited to the above-mentioned aspect and, for example, may include an aspect in which one vehicle detector is disposed on a main road including two lanes L1, L2. Moreover, other embodiments may include an aspect in which one, or two or more vehicle detectors is/are disposed on a main road including three or more lanes. In a case where, in this case, a vehicle detector is disposed on a roadside of a lane, a vehicle running on the lane that is closer to the vehicle detector may shield the vehicle running on the lane that is farther from the vehicle detector. This may prevent the vehicle detector from detecting the vehicle running on the further lane. Hence, in an aspect where a vehicle detector is shared by a plurality of lanes or in an aspect where a main road including three or more lanes is provided with a vehicle detector(s), the vehicle detector(s) is(are) attached to a gantry and thus fixed over the lanes L1 and L2 constructed across the lanes L1 and L2 in the lane width direction (in the ±Y direction of FIG. 1).

Wired connection (by means of optical cables and/or Ethernet (trade name) cables, which are described later) is provided: between the toll collection processing device 1a and each of the wireless communication control devices 2a and 2b; between the wireless communication control devices 2a and 2b and their respective roadside antennas 3a and 3b; and the toll collection processing device 1a and each of the vehicle detectors 5a and 5b.

The roadside antennas 3a and 3b are interfaces for wireless communication which wirelessly communicate with the onboard unit A1 via radio waves.

The roadside antenna 3a wirelessly communicates with the onboard unit A1 present within a range of specified communication region Q1 (communication range) prespecified on the road surface of the lane L1. That is, communication processing is carried out on the vehicle A running on the lane L1 via the roadside antenna 3a. Moreover, the roadside antenna 3b wirelessly communicates with the onboard unit A1 present within a range of specified communication region Q2 (communication range) prespecified on the road surface of the lane L2. That is, communication processing is carried out on the vehicle A running on the lane L2, via the roadside antenna 3b.

In this way, the present embodiment is an aspect in which communication processing for toll collection is carried out on the vehicles A running on the two lanes L1 and L2 via the two roadside antennas 3a and 3b, respectively.

Note that other embodiments are not limited to the above-mentioned aspect and, for example, may include an aspect in which one roadside antenna is disposed on a main road including two lanes L1 and L2. In this case, this one roadside antenna sets the specified communication region including the road surfaces of both of the lanes L1 and L2.

Moreover, other embodiments may include an aspect in which one or more roadside antennas is/are disposed on a main road including three or more lanes.

Functional Elements of the Toll Collection System

Figure 2:
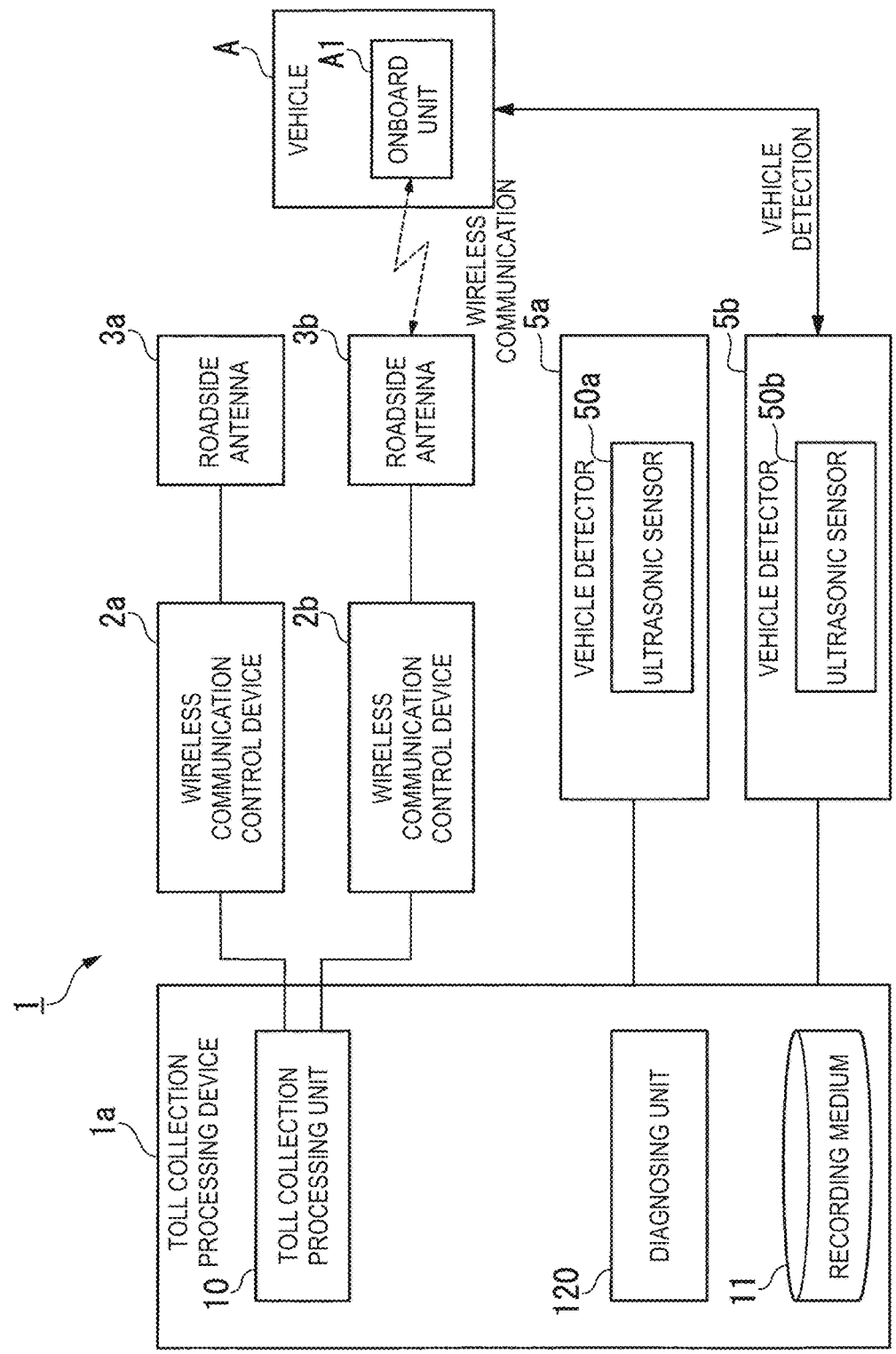
FIG. 2 is a diagram illustrating some functional elements of the toll collection system according to Embodiment 1.

FIG. 2 is a diagram illustrating the functional elements of the toll collection system according to Embodiment 1.

As illustrated in FIG. 2, the toll collection processing device 1a of the toll collection system 1 includes a toll collection processing unit 10, a diagnosing unit 12, and a recording medium 11.

The toll collection processing unit 10 collects information for toll collection acquired via communication processing with the onboard unit A1 from the wireless communication control devices 2a and 2b. In addition, the toll collection processing unit 10 carries out toll collection processing on users of the expressway based on this information for toll collection.

The diagnosing unit 120 determines whether an abnormality has occurred in at least any one of the toll collection processing unit 10, the wireless communication control devices 2a and 2b, and the roadside antennas 3a and 3b. Functional elements of the diagnosing unit 120 will be described later.

The recording medium 11 stores: a vehicle detection result, which is a result representing the detection of the vehicle A by one of the vehicle detectors 5a and 5b; a toll collection processing result, which is a result of the toll collection processing performed by the toll collection processing unit 10 for the vehicle A; and a variety of information used by the diagnosing unit 120 when the diagnosing unit 120 determines whether an abnormality has occurred in the toll collection system 1.

Specifically, the wireless communication control devices 2a and 2b acquire a variety of information received via communication processing with the onboard unit A1. In addition, the wireless communication control devices 2a and 2b summarize the variety of acquired information and generate information for toll collection with regard to onboard unit A1 having communicated with the wireless communication control devices 2a and 2b.

The wireless communication control devices 2a and 2b carry out communication processing with the onboard unit A1 via roadside antennas 3a and 3b, respectively, based on predetermined communication specifications. Here, in the present embodiment, the predetermined communication specifications are Association of Radio Industries and Businesses (ARIB) standard specifications, which are the standard communication specifications of dedicated short-range communication (DSRC) systems.

Specifically, the wireless communication control devices 2a and 2b acquire a variety of information via the dedicated short-range communication (DSRC) processing with the onboard unit A1 and recorded in the internal memory of the onboard unit A1, and the like.

In the present embodiment, optical cables supporting high speed data communications are provided for the communications between the roadside antenna 3a and the wireless communication control device 2a, as well as between the roadside antenna 3b and the wireless communication control device 2b.

Moreover, in the present embodiment, the wireless communication control device 2a and the wireless communication control device 2b are connected to the toll collection processing unit 10 of the toll collection processing device 1a installed in a communication tower T (FIG. 1) via Ethernet (trade name) cables.

However, other embodiments are not limited to the above-mentioned aspect and may include an aspect of connection via communication cables other than optical cables and Ethernet (trade name) cables.

Note that while the present embodiment has been described as an aspect in which the wireless communication control devices 2a and 2b are installed on the roadsides of lanes L1 and L2, respectively, and in the vicinity of the gantry G as illustrated in FIG. 1, other embodiments are not limited to this aspect. For example, in an acceptable aspect, the wireless communication control devices 2a and 2b may be installed in the communication tower T (FIG. 1). In this case, the roadside antennas 3a and 3b are connected respectively to the wireless communication control devices 2a and 2b via optical cables or the like wired from the gantry G to the communication tower T.

As illustrated in FIG. 2, the vehicle detectors 5a and 5b in the present embodiment respectively include ultrasonic sensors 50a and 50b for detecting the vehicle A running on the lanes L1 and L2, respectively.

The ultrasonic sensor 50a detects whether a vehicle A is running on the line L1 by making an unillustrated transmitter emit ultrasonic waves to the lane L1 and making an unillustrated receiver receive the reflected waves of the ultrasonic waves. Specifically, the transmitter of the ultrasonic sensor 50a emits ultrasonic waves in the lane width direction (+Y direction). As such, the ultrasonic sensor 50a detects whether there is a vehicle A entering the specified communication region Q1. Likewise, the ultrasonic sensor 50b detects whether a vehicle A is running on the line L2 by making an unillustrated transmitter emit ultrasonic waves to the lane L2 and making an unillustrated receiver receive the reflected waves of the ultrasonic waves. Specifically, the transmitter of the ultrasonic sensor 50b emits ultrasonic waves in the lane width direction (-Y direction). As such, the ultrasonic sensor 50b detects whether there is a vehicle A entering the specified communication region Q2. Note that in the present embodiment, an aspect in which the vehicle detectors 5a and 5b respectively includes the ultrasonic sensors 50a and 50b is described, but such an aspect in not the only possible one. Other embodiments may include an aspect in which a vehicle detector include an optical sensor in place of an ultrasonic sensor.

In the present embodiment, the vehicle detectors 5a and 5b are connected to the toll collection processing device 1a installed in the communication tower T (FIG. 1) via Ethernet (trade name) cables.

However, other embodiments are not limited to the above-mentioned aspect and may include an aspect of connection via communication cables other than optical cables and Ethernet (trade name) cables.

Functional Elements of Diagnosing Unit

Figure 3:
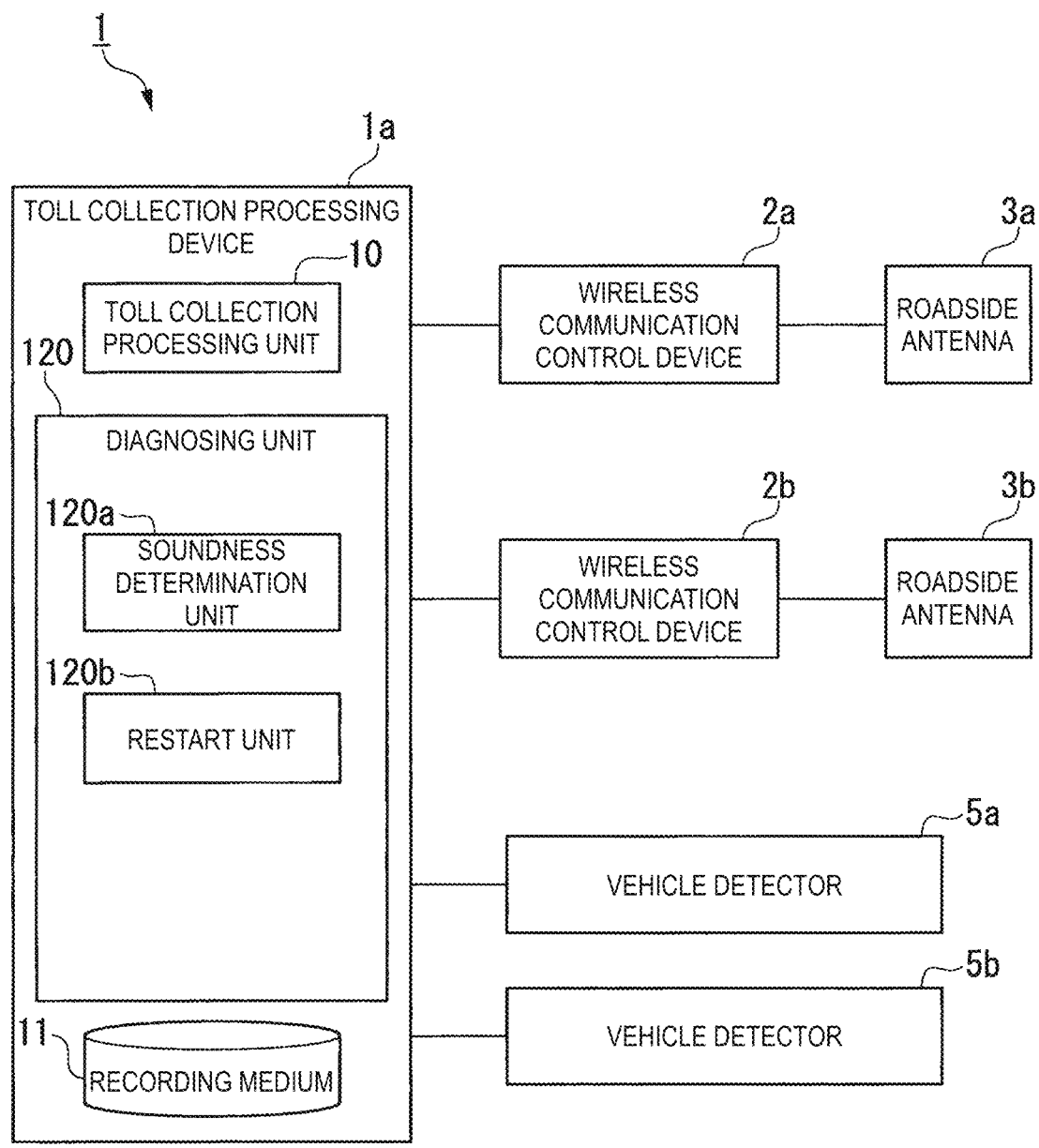
FIG. 3 is a diagram illustrating some functional elements of a diagnosing unit according to Embodiment 1.

FIG. 3 is a diagram illustrating some functional elements of a diagnosing unit according to Embodiment 1.

Figure 4:
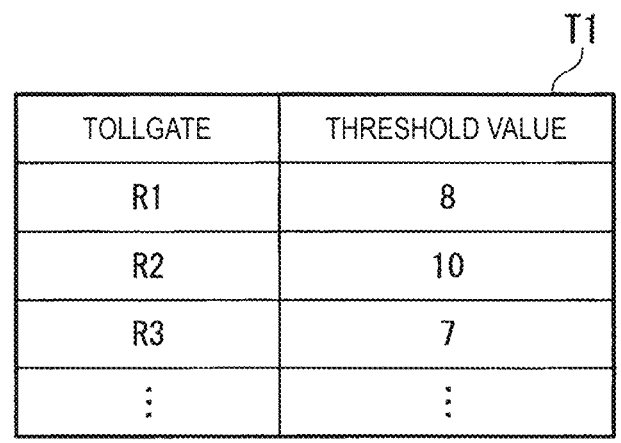
FIG. 4 is a table explaining some functions of the diagnosing unit according to Embodiment 1.

FIG. 4 is a table explaining some functions of the diagnosing unit according to Embodiment 1.

As illustrated in FIG. 3, the diagnosing unit 120 of the toll collection processing device 1a includes a soundness determination unit 120a and a restart unit 120b.

The soundness determination unit 120a receives, from the vehicle detectors 5a and 5b, vehicle detection results classified by lane and representing the entry of vehicle A into the specified communication regions Q1 and Q2, respectively. The soundness determination unit 120a also receives, from the toll collection processing unit 10, toll collection processing results classified by lane and representing the results of toll collection processing carried out for the onboard unit A1 of the vehicle A. Based on the vehicle detection results and the toll collection processing results, the soundness determination unit 120a determines, for individual lanes, whether an abnormality has occurred in at least one of the wireless communication control devices 2a and 2b, the roadside antennas 3a and 3b, and the toll collection processing unit 10 (hereinafter, referred to as the "system abnormality").

Some specific functions of the soundness determination unit 120a will be described below by taking the lane L1 as an example.

In a case where the soundness determination unit 120a receives, from the toll collection processing unit 10, the result of the toll collection processing for vehicle A running on the lane L1 between the reception of the result of detecting the vehicle A from the vehicle detector 5a and the reception the result of detecting the next vehicle from the vehicle detector 5a, the soundness determination unit 120a determines that the toll collection processing unit 10 has carried out properly the toll collection processing for the onboard unit A1 of the vehicle A. Hence, the soundness determination unit 120a determines that no system abnormality has occurred in the Lane L1.

In contrast, in a case where the soundness determination unit 120a does not receive, from the toll collection processing unit 10, the result of the toll collection processing for vehicle A running on the lane L1 between the reception of the result of detecting the vehicle A from the vehicle detector 5a and the reception the result of detecting the next vehicle from the vehicle detector 5a, the soundness determination unit 120a determines that the toll collection processing unit 10 has not carried out the toll collection processing. Here, there are two conceivable reasons for why the soundness determination unit 120a has not received the result of the toll collection processing: the vehicle A is equipped with no onboard unit A1 (hereinafter, referred to as the "onboard-unit not-mounted case(s)"); and though the vehicle A is equipped with an onboard unit A1, the toll collection processing for the onboard unit A1 has not been carried out properly (hereinafter, referred to as the "processing error case(s)").

The soundness determination unit 120a distinguishes the onboard-unit not-mounted cases from the processing error cases by counting the numbers of continuously skipped toll collection processing events (hereinafter, referred to as the "number of continuously skipped processing events") for individual lanes. Every time the soundness determination unit 120a receives a result of detecting a vehicle on the lane L1, the soundness determination unit 120a determines whether toll collection processing has been carried out for the lane L1 as described above. In a case where the soundness determination unit 120a determines that a toll collection processing event for the lane L1 has been skipped, the soundness determination unit 120a adds the number of the skipped processing events (one in this case) to the number of continuously skipped processing events for the lane L1. Otherwise, that is, in a case where the soundness determination unit 120a determines that a toll collection processing event for the lane L1 has been carried out, the soundness determination unit 120a resets (i.e., sets to zero) the number of continuously skipped processing events for the lane L1.

The soundness determination unit 120a counts the number of continuously skipped toll collection processing events for individual lanes in a similar manner.

Subsequently, the soundness determination unit 120a reads, from the recording medium 11, a threshold value table T1 illustrated in FIG. 4, and determines whether the number of continuously skipped processing events for the lane L1 exceeds the threshold value set in the threshold value table T1. The threshold value is a pre-set value based on the ownership rate (equipment ratio) of the onboard unit A1 and represents how many vehicles A without onboard unit A1 (vehicles A for each of which the toll collection processing has been skipped) have passed consecutively before the soundness determination unit 120a determines that a system abnormality has occurred. Alternatively, the threshold value may be set based on the ownership rate of the onboard unit A1 and the traffic volume for each tollgate. Note that in other embodiments, different threshold values may be set individually for different roads (expressways), or individually for different regions including a plurality of tollgates.

Now, suppose a situation where a toll collection processing event has been skipped for the lane L1 but the number of continuously skipped processing events does not exceed the threshold value for the lane L1. The soundness determination unit 120a interprets the situation as an onboard-unit not-mounted case, and thus determines that no system has abnormality occurred in the lane L1.

In contrast, suppose a different situation where a toll collection processing event has been skipped for lane L1 and the number of continuously skipped processing events exceeds the threshold value for the lane L1. The soundness determination unit 120a interprets the situation as a processing error case, and thus determines that a system abnormality has occurred in the lane L1.

For example, as illustrated in FIG. 4, a tollgate R1 has a pre-set threshold value of "8." Hence, in a case where in the tollgate R1, the number of continuously skipped processing events for the lane L1 becomes 8 or larger, the soundness determination unit 120a interprets the situation as a processing error case, and thus determines that a system abnormality has occurred in the lane L1.

The soundness determination unit 120a also determines, for lane L2, whether a system abnormality has occurred in a similar manner to that in the case of lane L1.

In a case where both the number of continuously skipped processing events for the lane L1 and the corresponding number for the lane L2 exceed the threshold value, the soundness determination unit 120a determines that a system abnormality has occurred in all the lanes and in the toll collection processing unit 10.

In a case where the soundness determination unit 120a determines that a system abnormality has occurred in the lane L1, the restart unit 120b restarts the roadside antenna 3a and the wireless communication control device 2a for the lane L1. In a case where the soundness determination unit 120a determines that a system abnormality has occurred in the lane L2, the restart unit 120b restarts the roadside antenna 3b and the wireless communication control device 2b for the lane L2.

The restarting of these apparatuses by the restart unit 120b solves the system abnormalities that have occurred in lanes L1 and L2. Thus, the roadside antennas 3a and 3b as well as the wireless communication control devices 2a and 2b for the lanes L1 and L2, respectively can be made to operate properly.

In a case where the soundness determination unit 120a determines that system abnormalities occur in both of the lanes L1 and L2 (i.e., in all the lanes), the restart unit 120b restarts: the toll collection processing unit 10; the roadside antennas 3a and 3b for all the lanes; and the wireless communication control devices 2a and 2b for all the lanes.

Processing Flow of Diagnosing Unit

Figure 5:
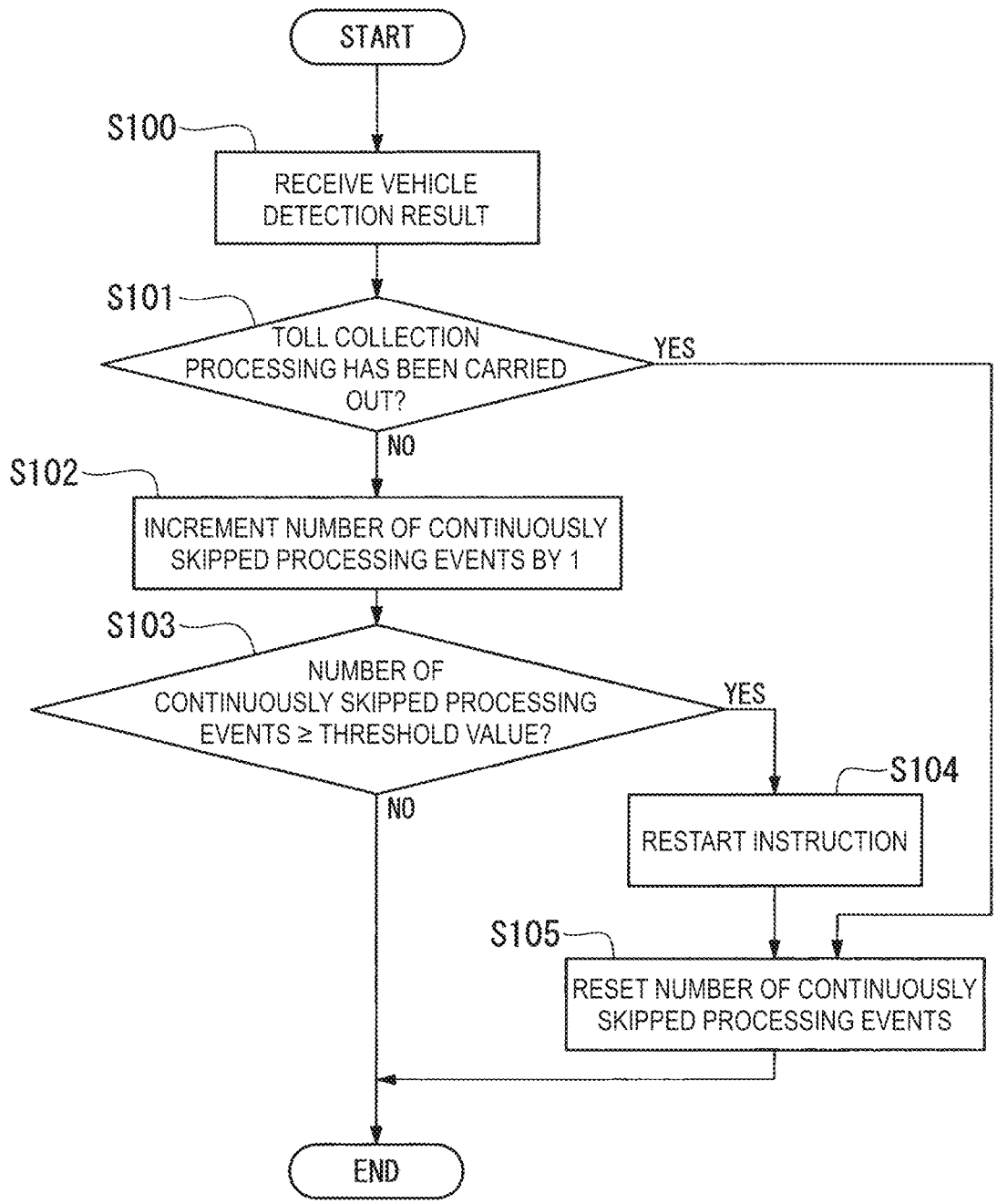
FIG. 5 is a diagram illustrating a processing flow of the diagnosing unit according to Embodiment 1.

FIG. 5 is a diagram illustrating a processing flow of the diagnosing unit according to Embodiment 1.

A specific processing flow of the diagnosing unit 120 will be described below by taking the lane L1 as an example. The diagnosing unit 120, however, is assumed to carry out similar processing flows individually for all the lanes.

As illustrated in FIG. 5, the soundness determination unit 120a of the diagnosing unit 120 receives, from the vehicle detector 5a for the lane L1, a result of detecting a vehicle A representing the entry of the vehicle A into the specified communication region Q1 (Step S100).

Then, based on whether the soundness determination unit 120a has received, from the toll collection processing unit 10, a result of toll collection processing for the vehicle A passing through the specified communication region Q1 (i.e., running on the lane L1) between the reception of the result of detecting the vehicle A of the lane L1 from the vehicle detector 5a and the reception the result of detecting the next vehicle from the vehicle detector 5a, the soundness determination unit 120a determines whether the toll collection processing has been carried out for the vehicle A (Step S101).

If the soundness determination unit 120a receives, from the toll collection processing unit 10, the result of the toll collection processing for vehicle A running on the lane L1 between the reception of the result of detecting the vehicle A from the vehicle detector 5a and the reception the result of detecting the next vehicle from the vehicle detector 5a (Step S101: YES), the soundness determination unit 120a determines that the toll collection processing unit 10 has carried out properly the toll collection processing for the onboard unit A1 of the vehicle A. Hence, the soundness determination unit 120a determines that no system abnormality has occurred in the lane L1. Then, the soundness determination unit 120a resets (i.e., sets to zero) the number of continuously skipped processing events for the lane L1 (Step S105).

In contrast, if the soundness determination unit 120a does not receive, from the toll collection processing unit 10, the result of the toll collection processing for vehicle A running on the lane L1 between the reception of the result of detecting the vehicle A from the vehicle detector 5a and the reception the result of detecting the next vehicle from the vehicle detector 5a (Step S101: NO), the soundness determination unit 120a determines that the toll collection processing unit 10 has not carried out the toll collection processing for the vehicle A. Then, the soundness determination unit 120a increments (by adding 1) the number of continuously skipped processing events for the lane L1 (Step S102).

Subsequently, the soundness determination unit 120a reads, from the recording medium 11, a threshold value table T1 (FIG. 4), and determines whether the number of continuously skipped processing events for the lane L1 exceeds the threshold value set in the threshold value table T1 (Step S103). Based on the number of continuously skipped processing events for the lane L1 and the threshold value set in the threshold value table T1, the soundness determination unit 120a identifies the reason for the skipping of the toll collection processing event: either corresponding to the "onboard-unit not-mounted case (where the vehicle A is equipped with no onboard unit A1)"; or corresponding to the "processing error case (where the vehicle A is equipped with an onboard unit A1 but the toll collection processing for the onboard unit A1 has not been carried out properly)."

Now, suppose a situation where a toll collection processing event has been skipped for the vehicle A on the lane L1 (Step S101: NO) but the number of continuously skipped processing events does not exceed the threshold value for the lane L1 (Step S103: NO). The soundness determination unit 120a interprets the situation as an onboard-unit not-mounted case, and thus determines that no system abnormality has occurred in the lane L1.

In contrast, suppose a different situation where a toll collection processing event has been skipped for lane L1 (Step S101: NO) and the number of continuously skipped processing events exceeds the threshold value for the lane L1 (Step S103: YES). The soundness determination unit 120a interprets the situation as a processing error case, and thus determines that a system abnormality has occurred in the lane L1.

Subsequently, if the soundness determination unit 120a determines that the number of continuously skipped processing events for the lane L1 exceeds the threshold value (Step S103: YES) and in addition, that a system abnormality has occurred in the lane L1, the restart unit 120b of the diagnosing unit 120 outputs a restart instruction to restart the roadside antenna 3a and the wireless communication control device 2a for the lane L1 (Step S104).

Then, once the restart unit 120b outputs the restart instruction to restart the roadside antenna 3a and the wireless communication control device 2a for the lane L1, the soundness determination unit 120a resets (i.e., sets to zero) the number of continuously skipped processing events for the lane L1 (Step S105). Upon the completion of restart processing, the roadside antenna 3a and the wireless communication control device 2a for the lane L1 recover from the abnormal state and operate properly.

Note that in a case where both the number of continuously skipped processing events for the lane L1 and the corresponding number for the lane L2 exceed the threshold value, the soundness determination unit 120a determines that a system abnormality has occurred in all the lanes. In this case, the restart unit 120b outputs a restart instruction to restart: the toll collection processing unit 10; the roadside antennas 3a and 3b for all the lanes; and the wireless communication control devices 2a and 2b for all the lanes.

By repeating the above-described processing flow, the diagnosing unit 120 determines whether an abnormality has occurred in the toll collection system 1. In addition, in a case where the diagnosing unit 120 determines that an abnormality has occurred in the toll collection system 1, at least any one of the roadside antennas 3a and 3b, the wireless communication control devices 2a and 2b, and the toll collection processing unit 10 is restarted.

Advantageous Effects

As has been described thus far, the toll collection system 1 according to the present embodiment includes: the roadside antennas 3a and 3b operable to carry out wireless communications with the onboard unit A1 mounted on the vehicle A; the wireless communication control devices 2a and 2b operable to carry out communication processing based on predetermined communication specifications (ARIB standard specifications) with the onboard unit A1 via the roadside antennas 3a and 3b; the toll collection processing unit 10 operable to acquire a result of the communication processing from the wireless communication control devices 2a and 2b and to carry out toll collection processing for the onboard unit A1 based on the result of the communication processing; the vehicle detectors 5a and 5b operable to detect a vehicle A entering any of the communication ranges (specified communication regions Q1 and Q2) of the roadside antennas 3a and 3b; the soundness determination unit 120a operable to determine, based on a detection result of the vehicle A by the vehicle detectors 5a and 5b and a result of the toll collection processing by the toll collection processing unit 10, whether an abnormality has occurred in at least any one of the roadside antennas 3a and 3b, the wireless communication control devices 2a and 2b, and the toll collection processing unit 10.

In a known toll collection system, an ETC central unit monitoring the toll collection system determines whether a system abnormality has occurred. With this configuration, it is difficult for the ETC central unit to identify the reason for no toll collection processing being carried out: either because no vehicle passes or because a system abnormality has occurred. Hence, in the known toll collection system, it takes a relatively long time for the ETC central unit to determine that a system abnormality has occurred.

In the present embodiment, however, in the case where the soundness determination unit 120a determines, based on the result of the communication processing with the onboard unit A1, that the toll collection processing for the vehicle A detected by any one of the vehicle detectors 5a and 5b is skipped, the soundness determination unit 120a counts the numbers of continuously skipped processing events for the individual lanes, which represent the numbers of consecutively skipped toll collection processing events for the individual lanes. Based on whether the toll collection processing result is reasonable in light of the result of detecting the vehicle A, the soundness determination unit 120a detects quickly the occurrence of a system abnormality in the roadside antennas 3a and 3b, and the wireless communication control devices 2a and 2b for the individual lanes. To be more specific, based on whether the numbers of continuously skipped processing events thus counted for individual lanes in the above-described way exceed the threshold value set in the threshold value table T1 (FIG. 4), the soundness determination unit 120a detects quickly the occurrence of a system abnormality in the roadside antennas 3a and 3b, and the wireless communication control devices 2a and 2b for the individual lanes.

In addition, in the case where both the number of continuously skipped processing events for the lane L1 and the corresponding number for the lane L2 exceed the threshold value, the soundness determination unit 120a detects quickly the occurrence of a system abnormality in all the lanes.

In addition, the toll collection system 1 according to the present embodiment further includes the restart unit 120b operable to restart at least any one of the roadside antennas 3a and 3b, the wireless communication control devices 2a and 2b, and the toll collection processing unit 10 in a case where the soundness determination unit 120a determines that a system abnormality has occurred. As such, in the case where soundness determination unit 120a determines that a system abnormality has occurred, the restart unit 120b restarts at least any one of the roadside antennas 3a and 3b, the wireless communication control devices 2a and 2b, and the toll collection processing unit 10. This, in turn, allows the toll collection system 1 to recover from the abnormal state and to be back in its proper operation.

In addition, in the present embodiment, the soundness determination unit 120a determines whether a system abnormality has occurred in each of all the lanes. This allows the restarting to be limited to the roadside antenna and the wireless communication control device for a particular lane where a system abnormality has occurred. Consequently, the restart unit 120b lets the roadside antenna(s) and the wireless communication control device(s) for the other lane(s) that are in proper operations continue their operations, and at the same time, allows the roadside antenna and the wireless communication control device for the lane where a system abnormality has occurred to recover from the abnormal state and to be back in their proper operations. This allows the restart unit 120b to minimize the adverse effects that the restart processing has on the entire toll collection system 1.

In addition, in the case where the soundness determination unit 120a determines that a system abnormality has occurred in all the lanes, the restart unit 120b restarts the roadside antennas 3a and 3b, the wireless communication control devices 2a and 2b, and the toll collection processing unit 10 for all the lanes. Accordingly, even in a case where a system abnormality has occurred in a plurality of apparatuses, the restart unit 120b allows the roadside antennas 3a and 3b, the wireless communication control devices 2a and 2b, and the toll collection processing unit 10 for all the lanes to recover from the abnormal state and to be back in their proper operations.

Modified Example of Embodiment 1

In the aspect described above in Embodiment 1, the soundness determination unit 120a of the diagnosing unit 120 counts the numbers of continuously skipped processing events for the individual lanes, and based on whether the numbers of continuously skipped processing events exceed the threshold value set in the threshold value table T1 (FIG. 4), the soundness determination unit 120a detects the occurrence of a system abnormality in the individual lanes.

The present modified example differs from Embodiment 1 in that the soundness determination unit 120a calculates a ratio of the result of the toll collection processing to the result of detecting the vehicle.

Figure 6:
FIG. 6 is a table explaining some functions of a diagnosing unit according to a modified example of Embodiment 1.

A modified example of Embodiment 1 will be described below with reference to FIGS. 6 to 7.
Processing Flow of Diagnosing Unit FIG. 6 is a table explaining some functions of a diagnosing unit according to the modified example of Embodiment 1.

Figure 7:
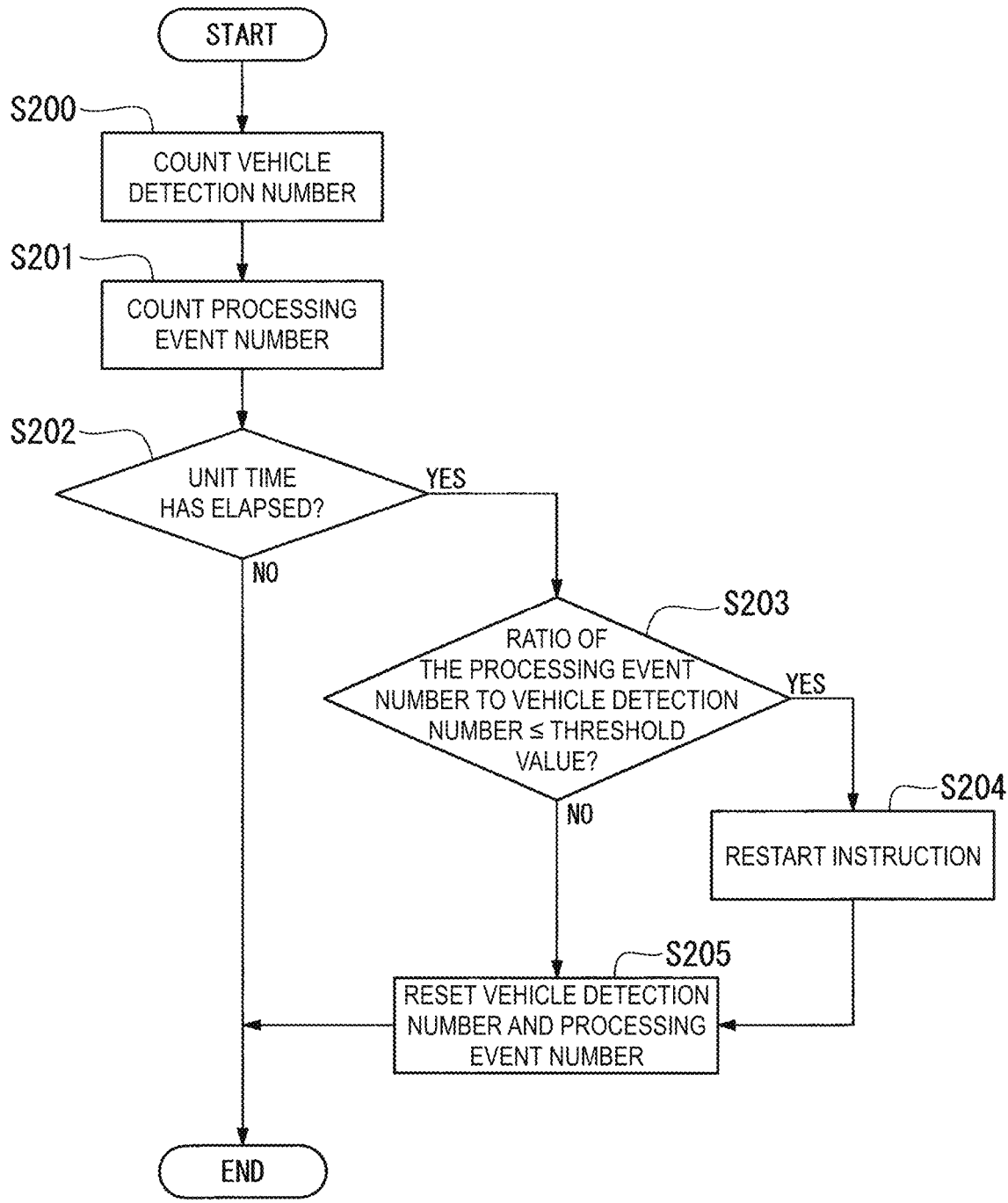
FIG. 7 is a diagram illustrating a processing flow of the diagnosing unit according to the modified example of Embodiment 1.

FIG. 7 is a diagram illustrating a processing flow of the diagnosing unit according to the modified example of Embodiment 1.

A specific processing flow of the diagnosing unit 120 will be described below by taking the lane L1 as an example. The diagnosing unit 120, however, is assumed to carry out similar processing flows individually for all the lanes. In addition the diagnosing unit 120 repeats the following processing flow at predetermined intervals.

As illustrated in FIG. 7, if the soundness determination unit 120a of the diagnosing unit 120 receives, from the vehicle detector 5a for the lane L1, a result of detecting a vehicle A representing the entry of the vehicle A into the specified communication region Q1, the soundness determination unit 120a counts the vehicle detection number, which shows the number of vehicles detected within a unit time (e.g., within an hour) (Step S200).

Subsequently, based on whether the soundness determination unit 120a has received, from the toll collection processing unit 10, a result of toll collection processing for the vehicle A passing through the specified communication region Q1 (i.e., running on the lane L1), the soundness determination unit 120a determines whether the toll collection processing has been carried out for the vehicle A. Then, the soundness determination unit 120a counts the processing event number, which shows the number of toll collection processing events carried out for the lane L1 within the unit time (Step S201).

Subsequently, the soundness determination unit 120a determines whether the unit time has elapsed (Step S202). If the soundness determination unit 120a determines that the unit time has not elapsed (Step S202: NO), the soundness determination unit 120a repeats the above-described processing of Step S200 to S201 until the soundness determination unit 120a determines that the unit time has elapsed.

In contrast, if the soundness determination unit 120a determines that the unit time has elapsed (Step S202: YES), the soundness determination unit 120a calculates the ratio of the processing event number counted within the unit time to the vehicle detection number for the lane L1 counted within the unit time. Then, the soundness determination unit 120a reads, from the recording medium 11, a threshold value table T2 (FIG. 6), and determines whether the ratio of the processing event number to the vehicle detection number for the lane L1 is equal to or smaller than threshold value set in the threshold value table T2 (Step S203). The threshold value is a pre-set value based on the ownership rate (equipment ratio) of the onboard unit A1. The threshold value or a smaller percentage of the number of vehicles A equipped with the onboard unit A1 (processing event number representing the carried out toll collection processing events) to the number of vehicles A that have passed within the unit of time (vehicle detection number) is required for the determination of the occurrence of a system abnormality. Note that the equipment ratio of the onboard unit A1 represents, for example, a statistically calculated value of the number of vehicles equipped with the onboard unit A1 to the number of owned vehicles in a predetermined area (e.g., a country, a prefecture, and the like) irrespective of vehicle type. Alternatively, the equipment ratio of the onboard unit A1 may represent a statistically calculated value of the number of vehicles equipped with the onboard unit A1 to the number of vehicles using expressways in a predetermined area (e.g., a country, a prefecture, and the like) irrespective of vehicle type. Still alternatively, the threshold value may be set based on the ownership rate of the onboard unit A1 and the traffic volume for each tollgate. Note that in other embodiments, different threshold values may be set individually for different roads (expressways), or individually for different regions including a plurality of tollgates.

Based on the ratio of the processing event number to the vehicle detection number for the lane L1 and the threshold value set in the threshold value table T2, the soundness determination unit 120a identifies the reason for the skipping of the toll collection processing event: either corresponding to the "onboard-unit not-mounted case (where the vehicle A is equipped with no onboard unit A1)"; or corresponding to the "processing error case (where the vehicle A is equipped with an onboard unit A1 but the toll collection processing for the onboard unit A1 has not been carried out properly)."

If the ratio of the processing event number to the vehicle detection number for the lane L1 is larger than the threshold value (Step S203: NO), the soundness determination unit 120a interprets the situation as an onboard-unit not-mounted case, and determines that no system abnormality has occurred in the lane L1.

In contrast, if the ratio of the processing event number to the vehicle detection number for the lane L1 is equal to or smaller than threshold value (Step S203: YES), the soundness determination unit 120a interprets the situation as a processing error case, and determines that a system abnormality has occurred in the lane L1.

Subsequently, if the ratio of the processing event number to the vehicle detection number for the lane L1 is equal to or smaller than threshold value (Step S203: YES) and in addition, the soundness determination unit 120a determines that a system abnormality has occurred in the lane L1, the restart unit 120b of the diagnosing unit 120 outputs a restart instruction to restart the roadside antenna 3a and the wireless communication control device 2a for the lane L1 (Step S204).

Then, once the restart unit 120b outputs the restart instruction to restart the roadside antenna 3a and the wireless communication control device 2a for the lane L1, the soundness determination unit 120a resets (i.e., sets to zero) the vehicle detection number and the processing event number for the lane L1 (Step S205).

Upon the completion of restart processing, the roadside antenna 3a and the wireless communication control device 2a for the lane L1 recover from the abnormal state and operate properly.

Note that in a case where both the ratio of the processing event number to the vehicle detection number for the lane L1 and the corresponding ratio for the lane L2 are equal to or smaller than the threshold value, the soundness determination unit 120a determines that a system abnormality has occurred in all the lanes. In this case, the restart unit 120b outputs a restart instruction to restart: the roadside antennas 3a and 3b for all the lanes; the wireless communication control devices 2a and 2b for all the lanes; and the toll collection processing unit 10.

By repeating the above-described processing flow at predetermined intervals, the diagnosing unit 120 determines whether an abnormality has occurred in the toll collection system 1. In addition, in a case where the diagnosing unit 120 determines that an abnormality has occurred in the toll collection system 1, at least any one of the roadside antennas 3a and 3b, the wireless communication control devices 2a and 2b, and the toll collection processing unit 10 is restarted.

Advantageous Effects

In Embodiment 1 described earlier, as the number of the continuously skipped toll collection processing events is counted, it may take a longer time than the unit time to detect the occurrence of a system abnormality in a tollgate with a small traffic volume.

In the present modified example, however, every time the unit time has elapsed, the soundness determination unit 120a of the diagnosing unit 120 determines, for each individual lane, whether the ratio of the processing event number to the vehicle detection number is equal to or smaller than the threshold value. As such, the soundness determination unit 120a regularly determines whether a system abnormality has occurred even in a tollgate with a small traffic volume.

In addition in Embodiment 1 described earlier, the detection of the occurrence of a system abnormality may be impossible in a case where the system abnormality includes: unstable operations of the roadside antennas 3a and 3b, the wireless communication control devices 2a and 2b, and the toll collection processing unit 10; and as a result, repetitions of some toll collection processing events carried out normally and some skipped events.

In the present modified example, however, the soundness determination unit 120a determines, based on the vehicle detection number and the processing event number both of which are counted for each individual lane within the unit time, whether the ratio of the processing event number to the vehicle detection number is equal to or smaller than the threshold value. In a case where a system abnormality including repetitions of some toll collection processing events carried out normally and some skipped events occurs, a smaller processing event number is recorded within the unit time than in a case where proper toll collection processing events are continuously carried out within the same unit time. Hence, in the case where a system abnormality of this type occurs, the ratio of the processing event number to the vehicle detection number is more likely to be equal to or smaller than the threshold value. This allows the soundness determination unit 120a to detect the occurrence of the system abnormality. Accordingly, the soundness determination unit 120a detects the occurrence of a system abnormality in the toll collection system 1 more accurately.

In addition, in the present modified example, only in the case where the soundness determination unit 120a determines that the unit time has elapsed, the soundness determination unit 120a carries out processing including: a calculation of the ratio of the processing event number to the vehicle detection number for each individual lane; and a determination of whether the ratio thus calculated is equal to or smaller than the threshold value set in the threshold value table T2 (FIG. 6). Hence, the soundness determination unit 120a carries out a reduced amount of processing, which, in turn, allows the diagnosing unit 120 to achieve a quicker overall processing performance.

Embodiment 2

Subsequently, a toll collection system according to Embodiment 2 will be described below in detail with reference to FIGS. 8 to 11.

Note that the same components as those in Embodiment 1 will be denoted by the same reference symbols, with descriptions thereof omitted.

Overall Configuration of Toll Collection System

Figure 8:
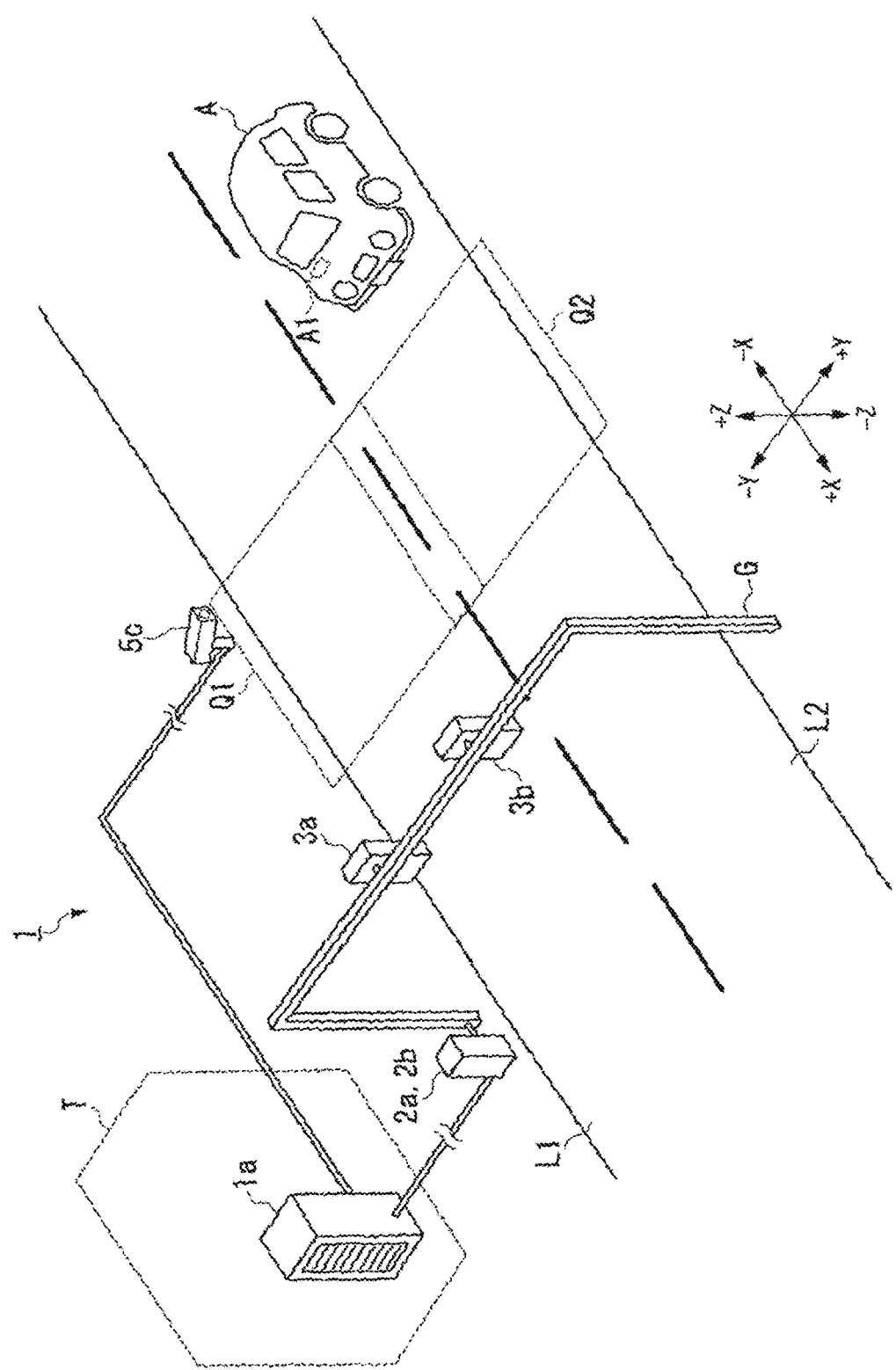
FIG. 8 is a diagram illustrating an overall configuration of a toll collection system according to Embodiment 2.

FIG. 8 is a diagram illustrating an overall configuration of a toll collection system according to Embodiment 2.

As illustrated in FIG. 8, a toll collection system 1 according to the present embodiment, includes, as in Embodiment 1, a toll collection processing device 1a, wireless communication control devices 2a and 2b, and roadside antennas 3a and 3b. In addition, the toll collection system 1 in the present embodiment includes a vehicle detector 5c in place of the vehicle detectors 5a and 5b in Embodiment 1.

The vehicle detector 5c is installed on the roadside of either the lane L1 or the lane L2, and on the upstream side of the gantry G in the lane direction (at a position away from the gantry G in −X direction of FIG. 1). The vehicle detector 5c detects the entry of vehicles A running on the lanes L1 and L2 into the corresponding specified communication regions Q1 and Q2, where the vehicles A are capable of carrying out wireless communication with the roadside antennas 3a and 3b, respectively.

The description in the present embodiment is an aspect where the single vehicle detector 5c is installed on the roadside of either the lane L1 and the lane L2, and where the single vehicle detector 5c detects the vehicles A running on the lane L1 and on the lane L2. The aspect, however, is not the only possible one. In other embodiments, two vehicle detectors may be installed with one on the roadside of the lane L1 and the other on the roadside of the lane L2. Moreover, other embodiments may include an aspect in which one, or two or more vehicle detectors is/are disposed on a main road including three or more lanes. Furthermore, other embodiment may include an aspect in which the vehicle detectors are attached to gantry, which is disposed across the lane width direction of the lanes L1 and L2 (extending in the ±Y direction of FIG. 1) and fixed over each of lanes L1 and L2.

Functional Elements of the Toll Collection System

Figure 9:
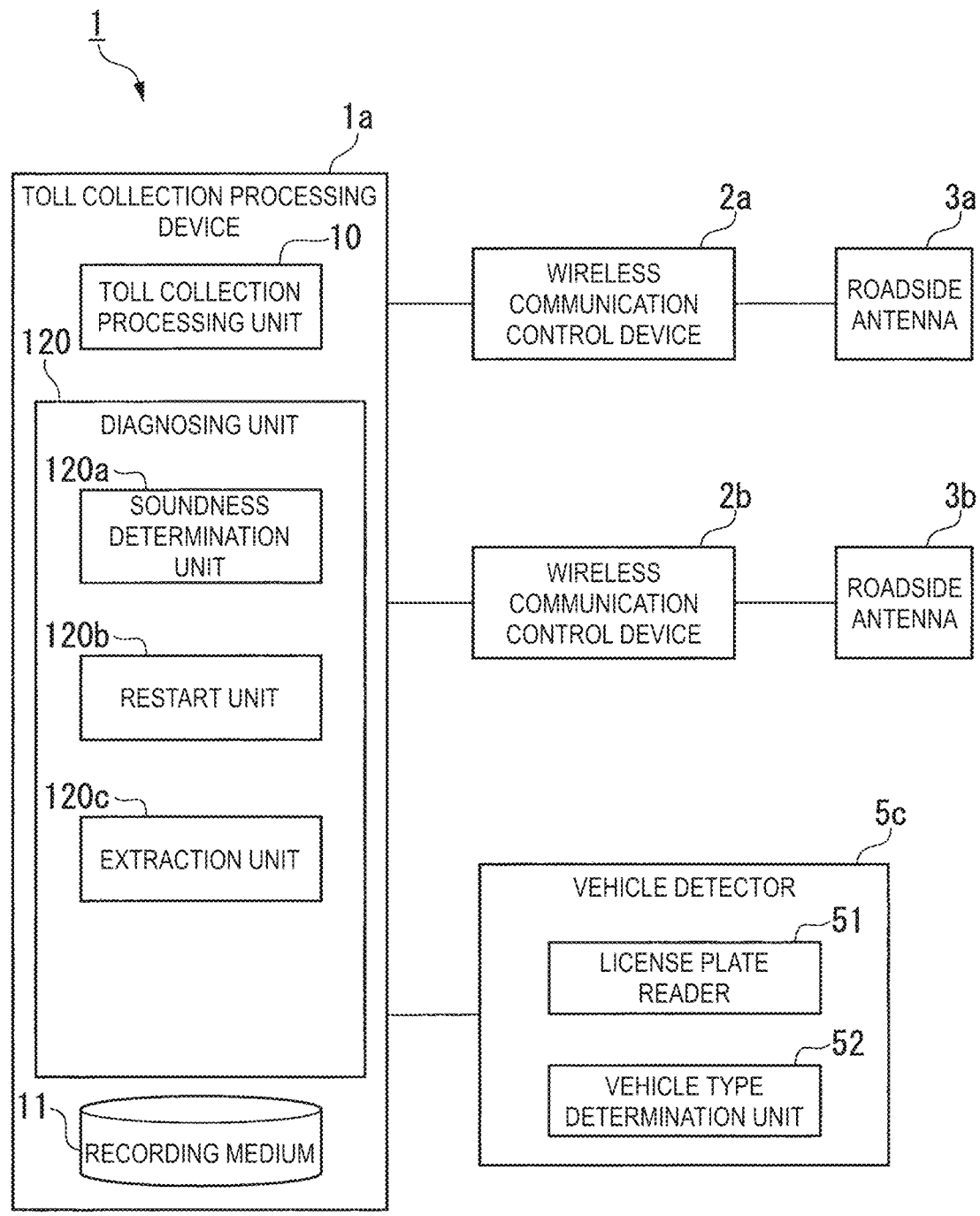
FIG. 9 is a diagram illustrating some functional elements of a toll collection system according to Embodiment 2.

FIG. 9 is a diagram illustrating the functional elements of the toll collection system according to Embodiment 2.

As illustrated in FIG. 9, the vehicle detector 5c in the present embodiment includes a license plate reader 51 and a vehicle type determination unit 52.

The license plate reader 51 is disposed at a position from which the license plate reader 51 is capable of taking, from the front side (from the farther side in the traveling direction of the vehicle A, i.e., from the +X side in FIG. 8), images of the vehicle bodies of the vehicles A that have reached the specified communication regions Q1 and Q2 of the lanes L1 and L2. The license plate reader 51 takes images of the lanes L1 and L2 continually at regular intervals. Then, by carrying out predetermined image processing on the data on the images of the vehicles A that have reached the specified communication regions Q1 and Q2 of the lanes L1 and L2, the license plate reader 51 acquires the license plate information for the vehicles A (hereinafter, referred to as the "LP information"). Specifically, the LP information mentioned above includes the size of the license plate (plate size) attached to each vehicle A and the classification number marked on the license plate.

In addition, by carrying out predetermined image processing on the data on the taken images, the license plate reader 51 identifies the lane on which the vehicle A having the acquired LP information is running.

As such, the license plate reader 51 detects the entry of vehicle A into any of the specified communication regions Q1 and Q2, and acquires the LP information of the vehicle A and the information on the lane on which the vehicle A is running.

The vehicle type determination unit 52 of the vehicle detector 5c determines the vehicle type of the vehicle A based on the LP information of the vehicle A acquired by the license plate reader 51. The description in the present embodiment is an aspect where the vehicle type determination unit 52 identifies the vehicle type selected from five different types of A, B, C, D, and E. In other embodiments, however, vehicle types of different varieties may be employed for the identification.

As illustrated in FIG. 9, like the toll collection processing device 1a of the toll collection system 1 in Embodiment 1, the toll collection processing device 1a in the present embodiment includes a toll collection processing unit 10, a diagnosing unit 120, and a recording medium 11.

Like the diagnosing unit 120 of the toll collection processing device 1a in Embodiment 1, the diagnosing unit 120 in the present embodiment includes a soundness determination unit 120a and a restart unit 120b. In addition, the diagnosing unit 120 in the present embodiment further includes an extraction unit 120c.

The soundness determination unit 120a receives, from the vehicle detector 5c, as a vehicle detection result representing the entry of a vehicle A into any of the specified communication regions Q1 and Q2, information including: the date and time when the vehicle A is detected; the lane on which the vehicle A is running; the LP information acquired by the license plate reader 51; and the vehicle type identified by the vehicle type determination unit 52. The soundness determination unit 120a also receives, from the toll collection processing unit 10, as a toll collection processing result representing the result of the toll collection processing carried out on the onboard unit A1 of the vehicle A, information including the LP information stored, beforehand, in the onboard unit A1 of the vehicle A.

Based on the vehicle A detection result and the toll collection processing result, the soundness determination unit 120a determines, for each individual lane and for each individual vehicle type, whether a system abnormality has occurred in at least any one of the wireless communication control devices 2a and 2b, the roadside antennas 3a and 3b, and the toll collection processing unit 10.

Some specific functions of the soundness determination unit 120a will be described below.

Firstly, the soundness determination unit 120a receives the vehicle A detection result from the vehicle detector 5c. Once the soundness determination unit 120a receives the vehicle A detection result, the soundness determination unit 120a stores, in the recording medium 11, the time when the vehicle A is detected, the lane on which the vehicle A is running, the LP information acquired by the license plate reader 51, and the vehicle type identified by vehicle type determination unit 52 so that these items are associated with one another.

Subsequently, based on the vehicle A detection result received from the vehicle detector 5c and the toll collection processing result received from the toll collection processing unit 10, the soundness determination unit 120a determines whether the toll collection processing has been carried out for the vehicle A. Specifically, the soundness determination unit 120a compares the LP information included in the vehicle A detection result received from the vehicle detector 5c (LP information acquired by the license plate reader 51) with the LP information included in the toll collection processing result received from the toll collection processing unit 10 (LP information stored, beforehand, in onboard unit A1). Then, in a case where the LP information included in the vehicle A detection result is identical to the LP information included in the toll collection processing result, the soundness determination unit 120a determines that the toll collection processing unit 10 has carried out the toll collection processing for the vehicle A. In this case, the soundness determination unit 120a determines that no system abnormality has occurred in the lane L1.

In contrast, in a case where the LP information included in the vehicle A detection result is not identical to the LP information included in the toll collection processing result, the soundness determination unit 120a determines that the toll collection processing unit 10 has not carried out the toll collection processing for the vehicle A. Here, there are two conceivable reasons for why the soundness determination unit 120a has not received the result of the toll collection processing: the vehicle A is equipped with no onboard unit A1 (hereinafter, referred to as the "onboard-unit not-mounted case(s)"); and though the vehicle A is equipped with an onboard unit A1, the toll collection processing for the onboard unit A1 has not been carried out properly (hereinafter, referred to as the "processing error case(s)").

The soundness determination unit 120a distinguishes the onboard-unit not-mounted cases from the processing error cases by counting the numbers of continuously skipped toll collection processing events (hereinafter, referred to as the "number of continuously skipped processing events") for individual lanes and for individual vehicle types. Every time the soundness determination unit 120a receives a vehicle detection result for any of the lanes L1 and L2, the soundness determination unit 120a identifies the vehicle type of the vehicle and determines whether the toll collection processing has been carried out for the corresponding one of the lanes L1 and L2. In a case where, for example, the soundness determination unit 120a determines that a toll collection processing event for a vehicle of the vehicle type A on the lane L1 has been skipped, the soundness determination unit 120a adds the number of the skipped processing events (one in this case) to the number of continuously skipped processing events for vehicles of the vehicle type A on the lane L1. In addition, in a case where the soundness determination unit 120a determines that a toll collection processing event for a vehicle of the vehicle type B on the lane L1 has been skipped, the soundness determination unit 120a adds the number of the skipped processing events (one in this case) to the number of continuously skipped processing events for vehicles of the vehicle type B on the lane L1.

In contrast, in a case where the soundness determination unit 120a determines that the toll collection processing for a vehicle of the vehicle type A on the lane L1 has been carried out, the soundness determination unit 120a resets (i.e., sets to zero) the number of continuously skipped processing events for vehicles of the vehicle type A on the lane L1. At this time, however, the soundness determination unit 120a resets neither the numbers of continuously skipped processing events for vehicles of the other types on the lane L1 nor the numbers of continuously skipped processing events for vehicles of any vehicle type on the other lanes (e.g., on the lane L2).

As such, the soundness determination unit 120a counts the number of the continuously skipped toll collection processing events for each individual lane and for each individual vehicle type.

Figure 10:
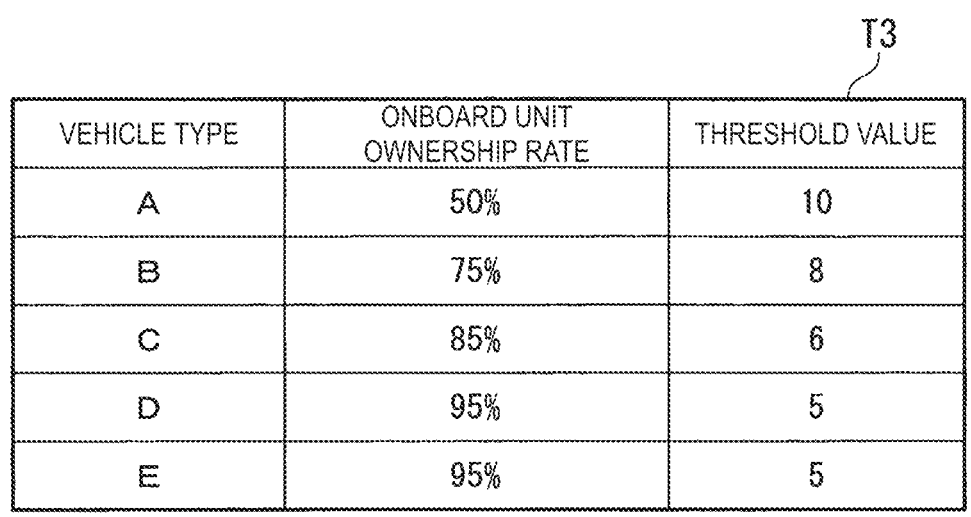
FIG. 10 is a table explaining some functions of a diagnosing unit according to Embodiment 2.

Subsequently, the soundness determination unit 120a reads, from the recording medium 11, a threshold value table T3 illustrated in FIG. 10, and determines whether any one of the numbers of continuously skipped processing events for the individual lanes L1 and L2 for the individual vehicle types exceeds the corresponding threshold value set in the threshold value table T3 for each individual vehicle type. The threshold value is a pre-set value for each individual vehicle type based on the ownership rate (equipment ratio) of the onboard unit A1 for each individual vehicle type, and represents (at least) how many vehicles A without onboard unit A1 (vehicles A for each of which the toll collection processing has been skipped) have passed consecutively before the soundness determination unit 120a determines that a system abnormality has occurred. Specifically, as illustrated in FIG. 10, the threshold value for the vehicle type E having an ownership rate of 95% is set to "(at least) 5," for example. Hence, in a case where (at least) 5 consecutive type-E vehicles that have passed are not equipped with an onboard unit A1, the soundness determination unit 120a determines that a system abnormality has occurred. On the other hand, a larger number of type-A vehicles, which have an ownership rate of 50%, are expected to be not equipped with an onboard unit A1 than the corresponding type-E vehicles, which have an ownership rate of 95%. Now, suppose a case where the threshold value for the type-A vehicles having a smaller ownership rate than the ownership rate of the type-E vehicles is set to the same threshold value as for the type-E vehicles, that is"(at least) 5." In this case, in the case where five consecutive type-A vehicles that are not equipped with an onboard unit A1 have passed, the soundness determination unit 120a may erroneously determine that a system abnormality has occurred even through the system is in proper operation. Hence, the threshold value for type-A vehicles having a smaller ownership rate is set to a larger value ("(at least) 10" in the example of FIG. 10) than the threshold value for type-E vehicles having a larger ownership rate.

Alternatively, the threshold values may be set based on the ownership rates of the onboard unit A1 for the individual vehicle types and the traffic volume of each tollgate. Note that in other embodiments, different threshold values may be set individually for different roads (expressways), or individually for different regions including a plurality of tollgates.

Now, suppose a situation where a toll collection processing event for a vehicle of any vehicle type is skipped for the lanes L1 and L2 but the number of continuously skipped processing events for the vehicles of the vehicle type running on the lanes L1 and L2 does not exceed the threshold value set for the vehicle type. The soundness determination unit 120a interprets the situation as an onboard-unit not-mounted case, and thus determines that no system abnormality has occurred in the lanes L1 and L2.

In contrast, suppose a different situation where a toll collection processing event for a vehicle of any vehicle type is skipped for the lanes L1 and L2 and the number of continuously skipped processing events for the vehicles of the vehicle type running on the lanes L1 and L2 exceeds the threshold value set for the vehicle type. The soundness determination unit 120a interprets the situation as a processing error case, and thus determines that a system abnormality has occurred in the lanes L1 and L2.

For example, as illustrated in FIG. 10, the type-A vehicles have a pre-set the threshold value of "10." Hence, in a case where the number of continuously skipped processing events for the type-A vehicles running on the lane L1 becomes 10 or larger, the soundness determination unit 120a interprets the situation as a processing error case, and thus determines that a system abnormality has occurred in the lane L1.

Note that in the present embodiment, the numbers of continuously skipped processing events are counted individually for the vehicle types. Hence, in a case where, for example, the toll collection processing has been skipped for ten consecutive vehicles running on the lane L1 and all of the ten vehicles are of the vehicle type A, the number of continuously skipped processing events for the type-A vehicles running on the lane L1 becomes equal to or larger than the threshold value set for the type-A vehicles. Accordingly, the soundness determination unit 120a determines that a system abnormality has occurred in the lane L1. In contrast, in a case where the toll collection processing has been skipped for ten consecutive vehicles running on the lane L1 and the ten vehicles include six type-A vehicles and four type-B vehicles, neither the number of continuously skipped processing events for the type-A vehicles running on the Lane 1 nor the corresponding number for the type-B vehicles running on the lane L1 exceeds the corresponding threshold value set for the type-A vehicle or the type-B vehicle. In this case, the soundness determination unit 120a determines that no system abnormality has occurred in the lane L1.

The soundness determination unit 120a also determines, for lane L2, whether a system abnormality has occurred in a similar manner to that in the case of lane L1.

In addition, in a case where any one of the numbers of continuously skipped processing events for vehicles of individual vehicle types running on lane L1 and any one of the corresponding numbers for vehicles of individual vehicle types running on lane L2 exceed the corresponding threshold values set for individual vehicle types, the soundness determination unit 120a determines that a system abnormality has occurred in all the lanes and in the toll collection processing unit 10.

As in the case of Embodiment 1, in the case where the soundness determination unit 120a determines that a system abnormality has occurred in the toll collection system 1, the restart unit 120b of the diagnosing unit 120 restarts at least any one of the roadside antennas 3a and 3b, the wireless communication control devices 2a and 2b, and the toll collection processing unit 10.

The restarting of these apparatuses by the restart unit 120b solves the system abnormalities that have occurred in lanes L1 and L2. Thus, the roadside antennas 3a and 3b, the wireless communication control devices 2a and 2b, and the toll collection processing unit 10 for the lanes L1 and L2, respectively can be made to operate properly.

While the restart unit 120b is restarting the apparatuses in the toll collection system 1, the extraction unit 120c of the diagnosing unit 120 extracts, by lane, the vehicles A passing through the specified communication region Q1 of the lane L1 and the vehicles A passing through the specified communication region Q2 of the lane L2.

Specifically, in a case where, for example, the restart unit 120b has output a restart instruction to the roadside antenna 3a and the wireless communication control device 2a for the lane L1, the extraction unit 120c extracts, from the pieces of LP information of the vehicles A acquired by the license plate reader 51, the pieces of the LP information of the vehicles A running on the lane L1 between the time of outputting the restart instruction and the time of finishing the restart processing by the roadside antenna 3a and the wireless communication control device 2a.

As such, the extraction unit 120c extracts: the pieces of LP information of the vehicles A running on the lane L1 during the restart processing of the apparatuses for the lane L1; the pieces of LP information of the vehicles A running on the lane L2 during the restart processing of the apparatuses for the lane L2; and the pieces of LP information of the vehicles A running on all the lanes during the restart processing of the apparatuses for all the lanes and the toll collection processing unit 10.

Note that in the present embodiment, the extraction unit 120c stores, as the toll-unpaid vehicle information in recording medium 11, the pieces of the LP information of the vehicles A acquired by the license plate reader 51 during the restart processing of the apparatuses for the lane L1 or the lane L2, that is, the pieces of LP information of the vehicles A for each of which the toll collection processing is skipped. By referring to the toll-unpaid vehicle information stored in the recording medium 11, the monitoring person or the like of the tollgate may charge, at a later date, the toll to the users of the vehicles A for each of which the toll collection processing was skipped.

Processing Flow of Diagnosing Unit

Figure 11:
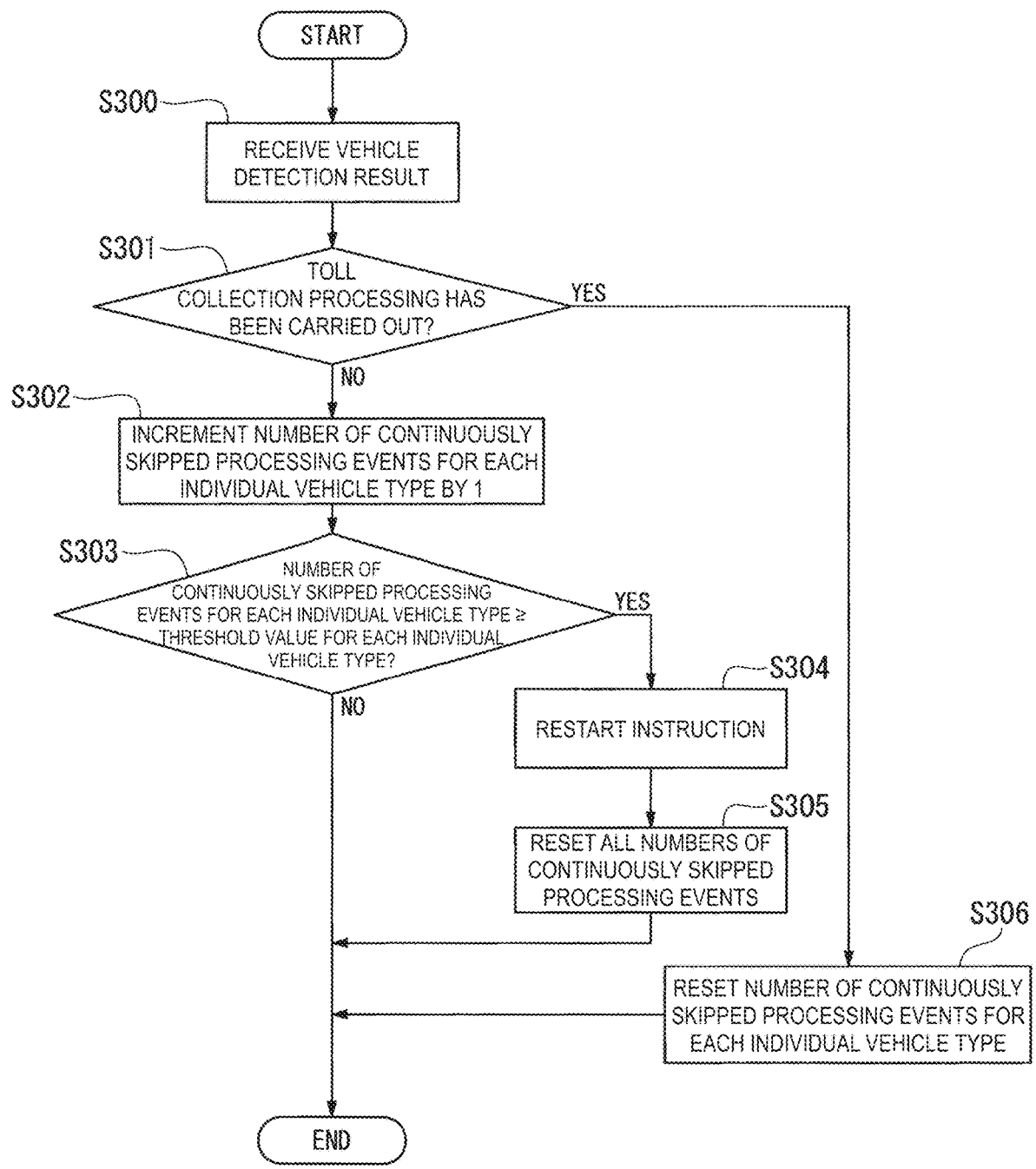
FIG. 11 is a diagram illustrating a processing flow of a diagnosing unit according to Embodiment 2.

FIG. 11 is a diagram illustrating a processing flow of the diagnosing unit according to Embodiment 2.

A specific processing flow of the diagnosing unit 120 will be described below by taking the lane L1 as an example. The diagnosing unit 120, however, is assumed to carry out similar processing flows individually for all the lanes.

As illustrated in FIG. 11, the soundness determination unit 120a of the diagnosing unit 120 receives, from the vehicle detector 5c, as the vehicle A detection result representing the entry of the vehicle A into the specified communication region Q1, information including: the date and time when the vehicle A is detected; the lane on which the vehicle A is running; the LP information; and the vehicle type (Step S300).

Subsequently, based on the vehicle A detection result received from the vehicle detector 5c and the toll collection processing result received from the toll collection processing unit 10, the soundness determination unit 120a determines whether the toll collection processing has been carried out for the vehicle A (Step S301).

If the LP information included in the vehicle A detection result (LP information acquired by the license plate reader 51) is identical to the LP information included in the toll collection processing result (LP information stored, beforehand, in the onboard unit A1), the soundness determination unit 120a determines that the toll collection processing unit 10 has carried out the toll collection processing properly for the vehicle A (Step S301: YES). In this case, the soundness determination unit 120a determines that no system abnormality has occurred in the lane L1. Then, the soundness determination unit 120a resets (i.e., sets to zero) the number of continuously skipped processing events for the vehicle type of the vehicle A among the numbers of continuously skipped processing events for the lane L1 (Step S306).

In contrast, if the LP information included in the vehicle A detection result is not identical to the LP information included in the toll collection processing result (Step S301: NO), the soundness determination unit 120a determines that the toll collection processing unit 10 has not carried out the toll collection processing for the vehicle A. Then, the soundness determination unit 120a increments (by adding 1) the number of continuously skipped processing events for the vehicle type of the vehicle A among the numbers of continuously skipped processing events for the lane L1 (Step S302).

Subsequently, the soundness determination unit 120a reads, from the recording medium 11, a threshold value table T3 (FIG. 10), and determines whether any one of the numbers of continuously skipped processing events for the lane L1 for the individual vehicle types exceeds the corresponding threshold value set in the threshold value table T3 for each individual vehicle type (Step S303). Based on the numbers of continuously skipped processing events for the lane L1 for individual vehicle types and the threshold values set for the individual vehicle types in the threshold value table T3, the soundness determination unit 120a identifies the reason for the skipping of the toll collection processing event: either corresponding to the "onboard-unit not-mounted case (where the vehicle A is equipped with no onboard unit A1)"; or corresponding to the "processing error case (where the vehicle A is equipped with an onboard unit A1 but the toll collection processing for the onboard unit A1 has not been carried out properly)."

If a toll collection processing event is skipped for a vehicle A running on the lane L1 (Step S301: NO) and in addition, the vehicle A is of the vehicle type A, the soundness determination unit 120a determines whether the number of continuously skipped processing events for the type-A vehicles running on the lane L1 exceeds the threshold value set for the vehicle type A (Step S303). If the number of continuously skipped processing events for the type-A vehicles running on the lane L1 does not exceed the threshold value set for the vehicle type A (Step S303: NO), the soundness determination unit 120a interprets the situation as an onboard-unit not-mounted case, and thus determines that no system abnormality has occurred in the lane L1.

In contrast, if the number of continuously skipped processing events for the type-A vehicles running on the lane L1 exceeds the threshold value set for the vehicle type A (Step S303: YES), the soundness determination unit 120a interprets the situation as a processing error case, and thus determines that a system abnormality has occurred in the lane L1.

Subsequently, if it is determined that the number of continuously skipped processing events for the type-A vehicles running on the lane L1 exceeds the threshold value set for the vehicle type A (Step S303: YES) and in addition, that a system abnormality has occurred in the lane L1, the restart unit 120b of the diagnosing unit 120 outputs a restart instruction to restart the roadside antenna 3a and the wireless communication control device 2a for the lane L1 (Step S304).

Then, once the restart unit 120b outputs the restart instruction to restart the roadside antenna 3a and the wireless communication control device 2a for the lane L1, the soundness determination unit 120a resets (i.e., sets to zero) the number of continuously skipped processing events for the vehicles of all the vehicle types running on the lane L1 (Step S305). Upon the completion of restart processing, the roadside antenna 3a and the wireless communication control device 2a for the lane L1 recover from the abnormal state and operate properly. In addition, the extraction unit 120c extracts, from the recording medium 11, the pieces of LP information of the vehicles A acquired by the license plate reader 51 between the time when the restart unit 120b outputs the restart instruction and the time when the restart processing of the apparatuses for the lane L1 is finished.

Note that in a case where any one of the numbers of continuously skipped processing events for vehicles of individual vehicle types running on lane L1 and any one of the corresponding numbers for vehicles of individual vehicle types running on lane L2 exceed the threshold values set for the corresponding vehicle types, the soundness determination unit 120a determines that a system abnormality has occurred in all the lanes. In this case, the restart unit 120b outputs a restart instruction to restart: the roadside antennas 3a and 3b for all the lanes; the wireless communication control devices 2a and 2b for all the lanes; and the toll collection processing unit 10.

By repeating the above-described processing flow, the diagnosing unit 120 determines whether an abnormality has occurred in the toll collection system 1. In addition, in a case where the diagnosing unit 120 determines that an abnormality has occurred in the toll collection system 1, at least any one of the roadside antennas 3a and 3b, the wireless communication control devices 2a and 2b, and the toll collection processing unit 10 is restarted.

Advantageous Effects

As has been described thus far, the toll collection system 1 according to the present embodiment includes the vehicle detector 5c operable to detect a vehicle A entering any of the communication ranges (specified communication regions Q1 and Q2) of the roadside antennas 3a and 3b, and the vehicle detector 5c includes the vehicle type determination unit 52 operable to identify the vehicle type of the detected vehicle A. In addition, based on the vehicle A detection result acquired from the vehicle detector 5c and the toll collection processing result acquired from the toll collection processing unit 10, the soundness determination unit 120a of the diagnosing unit 120 determines, for the individual vehicle types, whether the toll collection processing has been carried out for the onboard unit A1 mounted on the vehicles A.

As such, based on whether the numbers of continuously skipped processing events counted for the individual vehicle types for the individual lanes exceed the corresponding threshold values set for the individual vehicle types in the threshold value table T3 (FIG. 10), the soundness determination unit 120a detects quickly, for each individual lane, the occurrence of a system abnormality in the roadside antennas 3a and 3b as well as the wireless communication control devices 2a and 2b. In addition as the soundness determination unit 120a counts the number of continuously skipped processing events for each individual vehicle type, the occurrence of a system abnormality is detected accurately even if different vehicle types have different ownership rate of the onboard unit A1.

In addition, the toll collection system 1 according to the present embodiment includes the extraction unit 120c, and the vehicle detector 5c includes the license plate reader 51. The extraction unit 120c extracts the pieces of the LP information that are acquired by the license plate reader 51 of the vehicle detector 5c while the restart unit 120b is carrying out the restart processing to restart any one of the roadside antennas 3a and 3b, the wireless communication control devices 2a and 2b, and the toll collection processing unit 10.

For example, while the restart unit 120b is carrying out the restart processing to restart the roadside antenna 3a and the wireless communication control device 2a for the lane L1, the toll collection processing can be carried out for none of the vehicles A that pass through the specified communication region Q1 of the lane L1. In the present embodiment, however, as described above, by making the extraction unit 120c extract the pieces of LP information of the vehicles A that pass through the specified communication region Q1 of the lane L1 while the restart processing is being carried out, the extraction unit 120c extracts the vehicles A that may pass through the specified communication region Q1 with the toll collection processing events skipped for the vehicles A. Then, the extraction unit 120c stores, as the toll-unpaid vehicle information in recording medium 11, the pieces of the LP information of the vehicles A acquired by the license plate reader 51 during the restart processing of the apparatuses for the lane L1, that is, the pieces of LP information of the vehicles A for each of which the toll collection processing is skipped. As such, by referring to the toll-unpaid vehicle information stored in the recording medium 11, the monitoring person or the like of the tollgate may charge, at a later date, the toll to the users of the vehicles A for each of which the toll collection processing was skipped. Thus made possible is the reduction of some operational disadvantages, such as one where no toll collection can be carried out for onboard unit A1 of vehicle A while the restart processing is being carried out.

Modified Example of Embodiment 2

In the aspect described above in Embodiment 2, the soundness determination unit 120a of the diagnosing unit 120 counts the numbers of continuously skipped processing events for the individual vehicle types for the individual lanes, based on whether the numbers of continuously skipped processing events for the individual vehicle types exceed the corresponding threshold values set for the individual vehicle types in the threshold value table T3 (FIG.

10), the soundness determination unit 120a determines whether a system abnormality has occurred.

The present modified example differs from Embodiment 2 in that the soundness determination unit 120a calculates a ratio of the result of the toll collection processing to the result of detecting the vehicle.

The modification of Embodiment 2 will be described with reference to FIGS. 12 to 13.

Processing Flow of Diagnosing Unit

Figure 12:
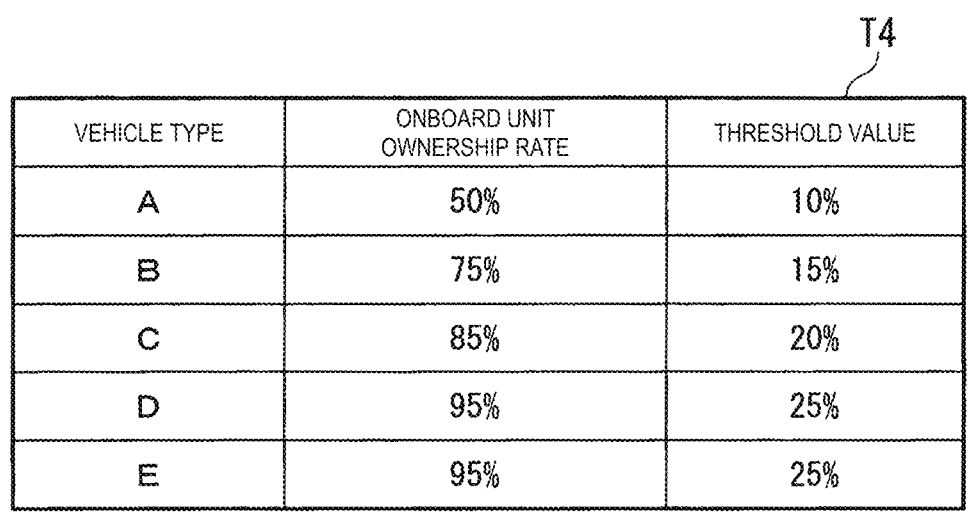
FIG. 12 is a table explaining some functions of the diagnosing unit according to a modified example of Embodiment 2.

FIG. 12 is a table explaining some functions of a diagnosing unit according to the modified example of Embodiment 2.

Figure 13:
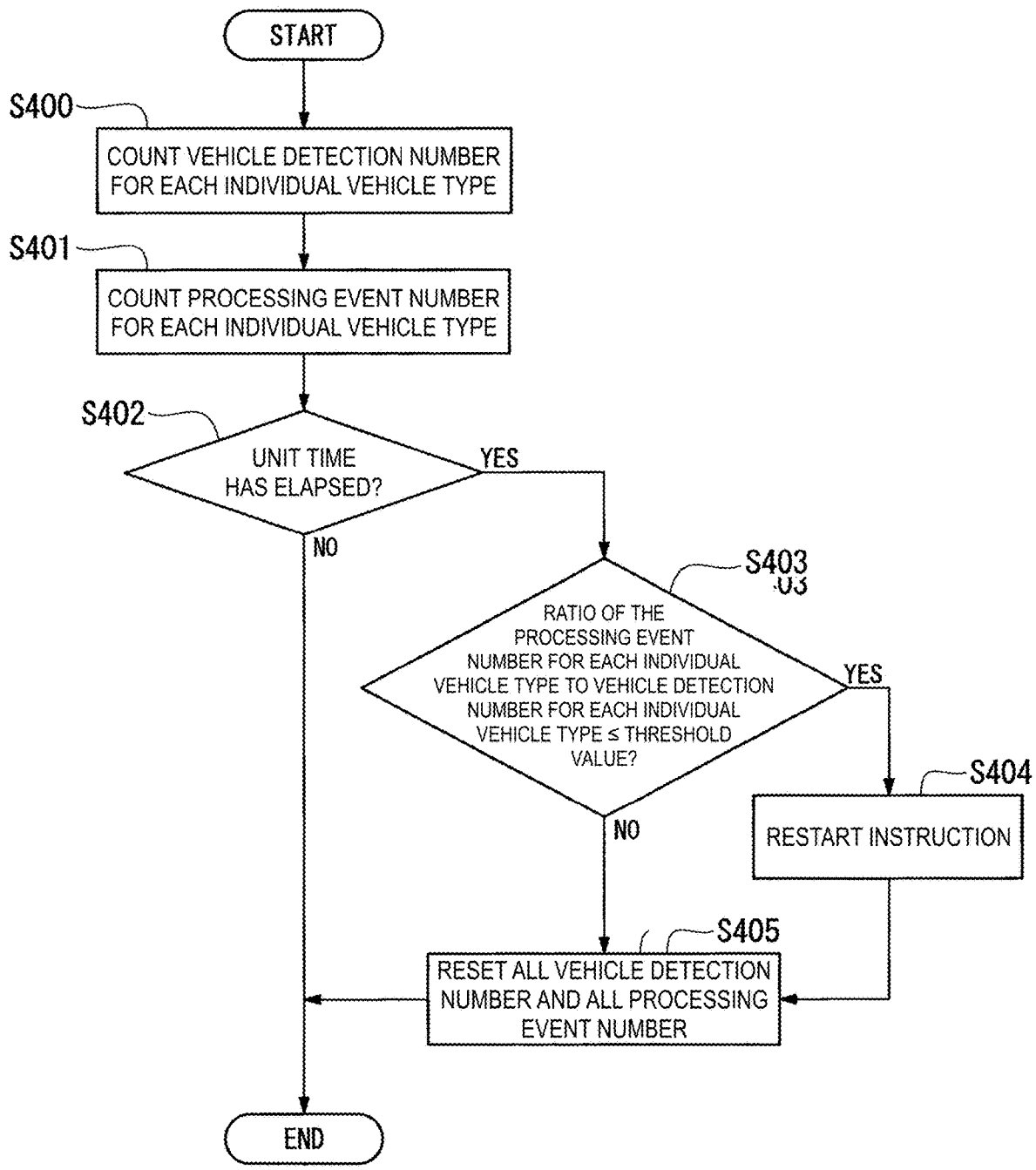
FIG. 13 is a diagram illustrating a processing flow of the diagnosing unit according to a modified example of Embodiment 2.

FIG. 13 is a diagram illustrating a processing flow of the diagnosing unit according to the modified example of Embodiment 2.

A specific processing flow of the diagnosing unit 120 will be described below by taking the lane L1 as an example. The diagnosing unit 120, however, is assumed to carry out similar processing flows individually for all the lanes. In addition the diagnosing unit 120 repeats the following processing flow continually at predetermined intervals.

As illustrated in FIG. 12, the soundness determination unit 120a of the diagnosing unit 120 receives, from the vehicle detector 5c, as the vehicle A detection result representing the entry of the vehicle A into the specified communication region Q1 of the lane L1, information including: the date and time when the vehicle A is detected; the lane on which the vehicle A is running; the LP information; and the vehicle type. The soundness determination unit 120a counts, for the individual vehicle types, the vehicle detection numbers representing the numbers of vehicle A detected within a unit time (e.g., within an hour) (Step S400).

Subsequently, based on whether the soundness determination unit 120a has received, from the toll collection processing unit 10, a result of toll collection processing for the vehicle A passing through the specified communication region Q1 (i.e., running on the lane L1), the soundness determination unit 120a determines whether the toll collection processing has been carried out for the vehicle A. Then, the soundness determination unit 120a counts, for each individual vehicle type, the processing event number, which shows the number of toll collection processing events carried out for the lane L1 within the unit time (Step S401).

Subsequently, the soundness determination unit 120a determines whether the unit time has elapsed (Step S402). If the soundness determination unit 120a determines that the unit time has not elapsed (Step S402: NO), the soundness determination unit 120a repeats the above-described processing of Step S400 to S401 until the soundness determination unit 120a determines that the unit time has elapsed.

In contrast, if the soundness determination unit 120a determines that the unit time has elapsed (Step S402: YES), the soundness determination unit 120a calculates the ratio of the processing event number counted within the unit time to the vehicle detection number for the lane L1 counted within the unit time. Then, the soundness determination unit 120a reads, from the recording medium 11, a threshold value table T4 (FIG. 12), and determines whether the ratio of the processing event number for each individual vehicle type to the vehicle detection number for each individual vehicle type for the lane L1 is equal to or smaller than threshold value set for each individual vehicle type in the threshold value table T4 (Step S403). The threshold value is a value set, beforehand, for each individual vehicle type based on the ownership rate (equipment ratio) of the onboard unit A1 for each individual vehicle type. The threshold value or a smaller percentage of the number of vehicles A equipped with the onboard unit A1 for each individual vehicle type (processing event number for each individual vehicle type representing the carried out toll collection processing events) to the number of vehicles A of each individual vehicle type that have passed within the unit of time (vehicle detection number) is required for the determination of the occurrence of a system abnormality. Specifically, as illustrated in FIG. 12, the threshold value for the vehicle type E having an ownership rate of 95% is set to "25% (or a smaller percentage)," for example. Hence, in a case where the ratio of the number of type-E vehicles A each of which is equipped with an onboard unit A1 to the number of type-E vehicles A that have passed within the unit time is equal to or smaller than 25%, the soundness determination unit 120a determines that a system abnormality has occurred. On the other hand, a smaller number of type-A vehicles, which have an ownership rate of 50%, are expected to be equipped with an onboard unit A1 than the corresponding type-E vehicles, which have an ownership rate of 95%. Hence, in a case where the threshold value for the type-A vehicles with an ownership rate of 50% is set to the same threshold value as the type-E vehicles, that is, to "25% (or a smaller percentage)," the soundness determination unit 120a may erroneously determine that a system abnormality has occurred even through the system is in proper operation. Hence, the threshold value for type-A vehicles having a smaller ownership rate is set to a smaller value ("10% (or a smaller percentage)" in the example of FIG. 10) than the threshold value for type-E vehicles having a larger ownership rate.

Note that in lieu of the above-described determination criterion of "the ratio of the vehicles A each of which is equipped with an onboard unit A1 becomes equal to or smaller than the threshold value, it is determined that a system abnormality has occurred," the soundness determination unit 120a may have a different determination criterion such as: "if the ratio of vehicles A each of which is equipped with an onboard unit A1 becomes equal to or larger than the threshold value, it is not determined that a system abnormality has occurred"; "if the ratio of vehicles A each of which is not equipped with an onboard unit A1 becomes equal to or larger than the threshold value, it is determined that a system abnormality has occurred"; or "if the ratio of vehicles A each of which is not equipped with an onboard unit A1 becomes equal to or smaller than the threshold value, it is determined that no system abnormality has occurred." In this case, the threshold value is set for each individual vehicle type based on the ownership rate for each individual vehicle type and the determination criterion employed.

Alternatively, the threshold values may be set based on the ownership rates of the onboard unit A1 for the individual vehicle types and the traffic volume of each tollgate. Note that in other embodiments, different threshold values may be set individually for different roads (expressways), or individually for different regions including a plurality of tollgates.

Based on the ratio of the processing event number for each individual vehicle type to the vehicle detection number for the vehicles of each individual vehicle type running on the lane L1 and the threshold value set for each individual vehicle type in the threshold value table T4, the soundness determination unit 120a identifies the reason for the skipping of the toll collection processing event: either corresponding to the "onboard-unit not-mounted case (where the vehicle A is equipped with no onboard unit A1)"; or corresponding to the "processing error case (where the vehicle A is equipped with an onboard unit A1 but the toll collection processing for the onboard unit A1 has not been carried out properly)."

If the ratio of the processing event number for each individual vehicle type to the vehicle detection number for the vehicles of each individual vehicle type running on the lane L1 is larger than the threshold value (Step S403: NO), the soundness determination unit 120a interprets the situation as an onboard-unit not-mounted case, and determines that no system abnormality has occurred in the lane L1. For example, if the vehicle detection number for the type-A vehicles running on the lane L1 is 100, and the processing event number for the type-A vehicles running on the lane L1 is 50, the ratio of the processing event number for the type-A vehicles to the vehicle detection number for the type-A vehicles is 50%, which exceeds the threshold value of "10%" set in the threshold value table T4 (FIG. 12) for the type-A vehicles (Step S403: NO). In this case, the soundness determination unit 120a determines that no system abnormality has occurred in the lane L1.

In contrast, if the ratio of the processing event number to the vehicle detection number for the lane L1 is equal to or smaller than threshold value (Step S403: YES), the soundness determination unit 120a interprets the situation as a processing error case, and determines that a system abnormality has occurred in the lane L1. For example, if the vehicle detection number for the type-A vehicles running on the lane L1 is 100, and the processing event number for the type-A vehicles running on the lane L1 is 8, the ratio of the processing event number for the type-A vehicles to the vehicle detection number for the type-A vehicles is 8%, which is equal to or smaller than the threshold value of "10%" set in the threshold value table T4 (FIG. 12) for the type-A vehicles (Step S403: YES). In this case, the soundness determination unit 120a determines that a system abnormality has occurred in the lane L1.

Subsequently, if the ratio of the processing event number for vehicles of each individual vehicle type running on the lane L1 to the vehicle detection number for the vehicles of each individual vehicle type running on the lane L1 is equal to or smaller than the threshold value for each individual vehicle type (Step S403: YES), and in addition, the soundness determination unit 120a determines that a system abnormality has occurred in the lane L1, the restart unit 120b of the diagnosing unit 120 outputs a restart instruction to restart the roadside antenna 3a and the wireless communication control device 2a for the lane L1 (Step S404).

Then, once the restart unit 120b outputs the restart instruction to restart the roadside antenna 3a and the wireless communication control device 2a for the lane L1, the soundness determination unit 120a resets (i.e., sets to zero) the vehicle detection number and the processing event number for the vehicles of all the vehicle types running on the lane L1 (Step S405).

Upon the completion of restart processing, the roadside antenna 3a and the wireless communication control device 2a for the lane L1 recover from the abnormal state and operate properly. In addition, as in the case of Embodiment 2 described above, the extraction unit 120c extracts the pieces of LP information acquired by the license plate reader 51 between the time when the restart unit 120b outputs the restart instruction and the time when the restart processing of the apparatuses is finished.

Note that in a case where both the ratio of the processing event number to the vehicle detection number for vehicles of any vehicle type running on the lane L1 and the corresponding ratio for vehicles of any vehicle type running on the lane L2 are equal to or smaller than the threshold value, the soundness determination unit 120a determines that a system abnormality has occurred in all the lanes. In this case, the restart unit 120b outputs a restart instruction to restart: the roadside antennas 3a and 3b for all the lanes; the wireless communication control devices 2a and 2b for all the lanes; and the toll collection processing unit 10.

By repeating the above-described processing flow at predetermined intervals, the diagnosing unit 120 determines whether an abnormality has occurred in the toll collection system 1. In addition, in a case where the diagnosing unit 120 determines that an abnormality has occurred in the toll collection system 1, at least any one of the roadside antennas 3a and 3b, the wireless communication control devices 2a and 2b, and the toll collection processing unit 10 is restarted.

Advantageous Effects

In Embodiment 2 described earlier, as the number of the continuously skipped toll collection processing events is counted, it may take a longer time than the unit time to detect the occurrence of a system abnormality in a tollgate with a small traffic volume.

In the present modified example, however, every time the unit time has elapsed, the soundness determination unit 120a of the diagnosing unit 120 determines, for each individual vehicle type and for each individual lane, whether the ratio of the processing event number to the vehicle detection number is equal to or smaller than the threshold value. As such, the soundness determination unit 120a regularly determines whether a system abnormality has occurred even in a tollgate with a small traffic volume.

In addition in Embodiment 2 described earlier, the detection of the occurrence of a system abnormality may be impossible in a case where the system abnormality includes: unstable operations of the roadside antennas 3a and 3b, the wireless communication control devices 2a and 2b, and the toll collection processing unit 10; and as a result, repetitions of some toll collection processing events carried out normally and some skipped events.

In the present modified example, however, the soundness determination unit 120a determines, based on the vehicle detection number and the processing event number both of which are counted for each individual vehicle type and for each individual lane within the unit time, whether the ratio of the processing event number to the vehicle detection number is equal to or smaller than the threshold value. In a case where a system abnormality including repetitions of some toll collection processing events carried out normally and some skipped events occurs, a smaller processing event number is recorded within the unit time than in a case where proper toll collection processing events are continuously carried out within the same unit time. Hence, in the case where a system abnormality of this type occurs, the ratio of the processing event number to the vehicle detection number is more likely to be equal to or smaller than the threshold value. This allows the soundness determination unit 120a to detect the occurrence of the system abnormality. Accordingly, the soundness determination unit 120a detects the occurrence of a system abnormality in the toll collection system 1 more accurately.

In addition, in the present modified example, only in a case where the soundness determination unit 120a determines that the unit time has elapsed, the soundness determination unit 120a carries out processing including: a calculation of the ratio of the processing event number to the vehicle detection number for each individual vehicle type and for each individual lane; and a determination of whether the ratio thus calculated is equal to or smaller than the threshold value set in the threshold value table T4 (FIG. 12). Hence, the soundness determination unit 120a carries out a reduced amount of processing, which, in turn, allows the diagnosing unit 120 to achieve a quicker overall processing performance.

Other Modified Examples

The descriptions in above-described Embodiments 1 and 2 as well as in their modified examples described above are descriptions of an aspect where the threshold values are set, beforehand, in the threshold value tables T1 to T4.

The present modified example differs from the above-described embodiments and their modified examples in that the soundness determination unit 120a of the diagnosing unit 120 automatically updates the threshold values in the threshold value tables T1 to T4.

In a case where the soundness determination unit 120a of the diagnosing unit 120 receives, from the vehicle detectors 5a, 5b, and 5c, the vehicle A detection result representing the entry of a vehicle A into any of the specified communication regions Q1 and Q2, the soundness determination unit 120a updates the vehicle-detection cumulative number representing the cumulative number of vehicles A detected by the vehicle detectors 5a, 5b, and 5c, and stores the updated vehicle-detection cumulative number in the recording medium 11.

In addition, in a case where the soundness determination unit 120a receives, from the toll collection processing unit 10, the toll collection processing result for the vehicles A passing through the specified communication regions Q1 and Q2 (i.e., running on the lanes L1 and L2), the soundness determination unit 120a updates the processing cumulative number representing the cumulative number of the carried-out toll collection processing events for the lanes L1 and L2, and stores the updated processing cumulative number in the recording medium 11.

Based on the ratio of the processing cumulative number recorded in a predetermined period (e.g., one month) to the vehicle-detection cumulative number recorded in the same period, the soundness determination unit 120a calculates, for each individual tollgate, the ownership rate (equipment ratio) of the onboard unit A1, that is, the ratio of the number of onboard units A1 to the number of the vehicles A. Then, by carrying out a predetermined statistical processing on the ownership rate of the onboard unit A1, the soundness determination unit 120a sets the threshold value for the tollgate.

For example, in a case where the vehicle-detection cumulative number for a particular tollgate in a predetermined period is 1000, and in addition, the processing cumulative number for the particular tollgate in the same period is 850, it is determined that the ownership rate of the onboard unit A1 for the particular tollgate is 85%. Then, by carrying out a predetermined statistical processing on the ownership rate of the onboard unit A1 for the particular toll gate, the soundness determination unit 120a sets the threshold value for the particular tollgate.

In an aspect where whether a system abnormality has occurred is determined based on the number of continuously skipped processing events, the soundness determination unit 120a sets the threshold value to, for example, "6," by carrying out a predetermined statistical processing on the ownership rate of the onboard unit A1 for the particular tollgate. In addition, in an aspect where whether a system abnormality has occurred is determined based on the ratio of the number of vehicles A each of which is equipped with an onboard unit A1 (processing event number representing the number of the carried-out toll collection processing events) to the number of vehicles A passing through within the same unit time (vehicle detection number), the soundness determination unit 120a sets the threshold value to, for example, "15%" by carrying out a predetermined statistical processing on the ownership rate of the onboard unit A for the particular tollgate.

Moreover, in an aspect where the vehicle detector 5c includes a vehicle type determination unit 52, the soundness determination unit 120a may set individually threshold values for vehicle types.

Thus, the soundness determination unit 120a in the present modified example determines whether a system abnormality has occurred based on the threshold value set for each individual tollgate.

In addition, the soundness determination unit 120a may set different threshold values for different months or different times of day based on the ownership rate of the onboard unit A1 recorded in the past for the same months or for the same times of day.

As such, even in a case where the ownership rate of the onboard unit A1 (the ratio of the vehicles A each of which is equipped with an onboard unit A1) changes depending on the tollgate or on the time of day, the soundness determination unit 120a makes the threshold value used in the determination of whether a system abnormality has occurred follow the ownership rate of the onboard unit A1 that changes as the time elapses. As such the occurrence of a system abnormality may be detected more accurately.

Note that the description in the present modified example is a case where the soundness determination unit 120a sets threshold values individually for the tollgates, but this is not the only possible way. In other embodiments, the ownership rates of the onboard unit A1 for individual tollgates may be sent to a computer in a central facility where the monitoring person is present. In this case, the computer in the central facility may set threshold values for individual tollgates or for individual areas each of which includes a plurality of tollgates.

In the foregoing, while certain embodiments of the present invention have been described, these embodiments are merely illustrative and not intended to limit the scope of the invention. These embodiments may be implemented in various other forms, with various omissions, substitutions, and alterations capable of being made without departing from the gist of the invention. These embodiments and modifications are included in the scope and gist of the invention and are also included in the scope of the invention described in the claims and equivalents thereof.

For example, the description in each of the above-described embodiments is of an aspect where the restart unit 120b of the diagnosing unit 120 restarts at least any one of the roadside antennas 3a and 3b, the wireless communication control devices 2a and 2b, and the toll collection processing unit 10, but such an aspect is not the only possible one. In other embodiment, the restart unit 120b may notify, for individual lanes, the computer of the central facility where the monitoring person is present that a system abnormality has occurred. Then, the monitoring person may determine whether the restarting is to be carried out, and may select the apparatus(es) to be restarted.

In this case, between the time when the monitoring person gives a restart instruction to an apparatus and the time when the apparatus finishes its restart processing, the extraction unit 120c of the diagnosing unit 120 extracts the LP information of each vehicle A running on the lane for which the apparatus being restarted serves. Thus made possible as in the above-described embodiments is the reduction of some operational disadvantages, such as one where no toll collection can be carried out for onboard unit A1 of vehicle A while the restart processing is being carried out.

In addition, the descriptions in the above-described embodiments are of an aspect where the extraction unit 120c extracts the pieces of the LP information of the vehicles running on the lanes L1 and L2 (passing through the specified communication regions Q1 and Q2) while the apparatuses in the toll collection system 1 are being restarted, and where the pieces of LP information of the vehicles A for each of which the toll collection processing is skipped are stored in the recording medium 11 as the toll-unpaid vehicle information, but such an aspect is not the only possible aspect. The extraction unit 120c may send pieces of toll-unpaid vehicle information one after another or at predetermined intervals to the computers of the central facility or the like where the monitoring person is present. Thus made possible as in the above-described embodiments is the reduction of some operational disadvantages, such as one where no toll collection can be carried out for onboard unit A1 of vehicle A while the restart processing is being carried out.

INDUSTRIAL APPLICABILITY

The above-mentioned toll collection system and soundness determination method provide a free flow type toll collection system which detects abnormalities quickly and accurately.

REFERENCE SYMBOLS LIST

1 Toll collection system
1a Toll collection processing device
10 Toll collection processing unit
120 Diagnosing unit
120a Soundness determination unit
120b Restart unit
120c Extraction unit
11 Recording medium
2a, 2b Wireless communication control device
3a, 3b Roadside antenna
5a, 5b, 5c Vehicle detector
50a, 50b Ultrasonic sensor
51 License plate reader
52 Vehicle type determination unit
A Vehicle
A1 Onboard unit
Q1, Q2 Specified communication region
G Gantry
L1, L2 Lane
T Communication tower
T1, T2, T3, T4 Threshold value table

The invention claimed is:

1. A toll collection system comprising:
a roadside antenna operable to carry out wireless communications with an onboard unit mounted on a vehicle;
a wireless communication controller operable to receive information for toll collection stored in the onboard unit via the roadside antenna using predetermined communication specifications of a dedicated short-range communications;
a toll collection processing device operable to acquire the information for toll collection from the wireless communication controller and to carry out toll collection processing to charge a toll to the onboard unit based on the information for toll collection; and
a vehicle detector including an ultrasonic sensor or an optical sensor and operable to detect a vehicle entering a communication range of the roadside antenna;
wherein the toll collection processing device is further operable to determine whether at least any one of the roadside antenna, the wireless communication controller, and the toll collection processing device is in an abnormal state in a case that a ratio of the number of the toll collection processing carried out with respect to the number of the vehicles detected by the vehicle detector is equal to or smaller than a predefined threshold.

2. The toll collection system according to claim 1, wherein
the toll collection processing device is further operable to output a restart instruction to carry out restart processing to at least any one of the roadside antenna, the wireless communication controller, and the toll collection processing device in a case that at least any one of the roadside antenna, the wireless communication controller, and the toll collection processing device is determined to be in the abnormal state.

3. The toll collection system according to claim 2, wherein
the optical sensor of the vehicle detector is a license plate reader operable to take an image of the vehicle and acquire license plate information from the image, and
the toll collection processing device is further operable:
to store the license plate information acquired by the license plate reader in a recording medium, and
to extract the license plate information of the vehicle which is acquired by the license plate reader during the restart processing from the recording medium.

4. The toll collection system according to claim 1, wherein
the toll collection processing device is further operable:
to calculate an equipment ratio representing the ratio of vehicles each of which is equipped with the onboard unit, the equipment ratio indicating a percentage of the number of toll collection processing carried out by the toll collection processing unit with respect to the number of the vehicles detected by the vehicle detector, and
to set, based on the equipment ratio, the predefined threshold.

5. A soundness determination method implemented in a toll collection system including:
a roadside antenna operable to carry out wireless communications with an onboard unit mounted on a vehicle;
a wireless communication controller operable to receive information for toll collection stored in the onboard unit via the roadside antenna using predetermined communication specifications of a dedicated short-range communications;
a toll collection processing device operable to acquire the information for toll collection from the wireless communication controller and to carry out toll collection processing to charge a toll to the onboard unit based on the information for toll collection; and
a vehicle detector including an ultrasonic sensor or an optical sensor and operable to detect a vehicle entering a communication range of the roadside antenna, the method comprising the steps of:
- acquiring, by means of the vehicle detector, a result of detecting the vehicle entering the communication range of the roadside antenna;
- acquiring a result of the toll collection processing carried out by means of the toll collection processing unit; and
- determining whether at least any one of the roadside antenna, the wireless communication controller, and the toll collection processing device is in an abnormal state in a case that a ratio of the number of the toll collection processing carried out with respect to the number of the vehicles detected by the vehicle detector is equal to or smaller than a predefined threshold.

* * * * *